United States Patent [19]

Ohnuki et al.

[11] Patent Number: 4,974,002
[45] Date of Patent: Nov. 27, 1990

[54] AUTOMATIC FOCUS ADJUSTING DEVICE

[75] Inventors: Ichiro Ohnuki, Kawasaki; Akira Akashi, Yokohama; Terutake Kadohara, Yokohama; Masaki Higashihara, Yokohama, all of Japan

[73] Assignee: Canon Kabushiki Kaisha, Tokyo, Japan

[21] Appl. No.: 313,513

[22] Filed: Feb. 22, 1989

[30] Foreign Application Priority Data

Feb. 22, 1988 [JP] Japan ................................ 63-039821

[51] Int. Cl.$^5$ ............................................ G03B 13/36
[52] U.S. Cl. ................................. 354/400; 354/402; 354/430
[58] Field of Search ................. 354/400, 402, 408, 430

[56] References Cited

U.S. PATENT DOCUMENTS 4,681,419  7/1987  Sakai et al. .
4,762,986  8/1988  Suda et al. .......................... 354/402
4,783,677 11/1988  Hamada et al. ..................... 354/430

Primary Examiner—Russell E. Adams
Attorney, Agent, or Firm—Fitzpatrick, Cella, Harper & Scinto

[57] ABSTRACT

An automatic focus adjusting device which takes into account a change in the position of the image plane of an object caused by movement of the object during the focus adjusting operation time and makes a lens in focus to the moving object. The position of the image plane of the object after the focus adjusting operation time is foreseeing-calculated with the result of a past focus adjusting operation as a factor, and the current focus adjusting operation time is foreseen in conformity with the foreseeing-calculated value, and the position of the image plane of the object is again foreseeing-calculated with the foreseen time as a factor.

10 Claims, 21 Drawing Sheets

AUTOMATIC FOCUS ADJUSTING DEVICE

BACKGROUND OF THE INVENTION

1. Field of the Invention

This invention relates to an automatic focus adjusting device for use in a camera or the like.

2. Related Background Art

A method of correcting an out-of-focus condition caused by movement of a moving object when the moving object is always pursued by an auto-focus (AF) system has already been proposed by the same assignee as the assignee of Japanese Patent Application No. 62-263728.

In the above-mentioned patent application, the movement of the image plane of the object is approximated to a quadratic function or a linear function while, on the other hand, the time required for distance measurement calculation, lens driving or release is foreseen under a certain assumption, and the position of the image plane of the object at a certain time in the future (for example, the time when the control of lens driving is completed or the time when the shutter curtains are moved after the release operation) is foreseen and in accordance with the result, lens driving is effected to thereby eliminate any pursuit delay relative to the moving object.

FIG. 2 of the accompanying drawings illustrates the lens driving correction method shown in the above-mentioned patent application. In the figure, the horizontal axis represents time t and the vertical axis represents the position d of the image plane of the object.

Curve f(t) indicated by a solid line represents the position of the image plane, at a time t, of the object which comes near the camera in the direction of the optic axis when the photo-taking lens is at infinity. Curve ((t) indicated by a broken line represents the position of the image plane of the object at the position of the photo-taking lens at the time t, and a section $[t_i, t_i']$ represents the focus detecting operation and a section $[ti_i', t_{i+1}]$ represents the lens driving operation. Accordingly, the difference in the direction of the vertical axis d between f(t) and l(t) at the same time t corresponds to the so-called defocus amount.

DFi represents the defocus amount detected at a time $t_i$, DLi represents the amount of lens driving as converted into the amount of movement of the image plane executed from the result of the focus detection at a time $t_{i-1}$, and $TM_i$ represents the time interval between the focus detecting operations.

In the example of the prior art shown in FIG. 2, the assumption that the position of the image plane of the object changes in accordance with a quadratic function is placed as a premise for correction. That is, it is assumed that if the current and past three positions of the image plane $(t_1, f_1), (t_2, f_2)$ and $(t_3, f_3)$ are known at a time $t_3$, the position $f_4$ of the image plane at a time $t_4$ can be foreseen.

However, what the camera can actually detect are not the positions $f_1$, $f_2$ and $f_3$ of the image plane, but the defocus amounts DF1, DF2, DF3 and the amount of lens driving DL1 and DL2 as converted into the amounts of movement of the image plane. The time $t_4$ is a value in the future to the last, and is actually a value which varies as the accumulating time of a accumulation type sensor is varied by the brightness of the object, but here, for simplicity, it is assumed as known in the relation that $t_4 - t_3 = t_3 - t_2$.

Under the above-described assumption, the amount of lens driving DL3 when lens driving is effected toward $t_4$ at a time $t_3'$ from the result of the focus detection at the time $t_3$ is found from the following equations:

$$at^2 + bt + c = f(t) \tag{1}$$

$$\begin{cases} at_1^2 + bt_1 + c = f_1 & (2) \\ at_2^2 + bt_2 + c = f_2 & (2)' \\ at_3^2 + bt_3 + c = f_3 & (2)'' \end{cases}$$

If in FIG. 1, a point $l_1$ is considered to be the origin, $$f_1 = DF1, \; f_2 = DF2 + DL1, \; f_3 = DF3 + DL2 + DL1 \tag{3}$$

$$t_1 = 0, \; t_2 = TM1, \; t_3 = TM1 + TM2 \tag{4}$$

If the equations (3) and (4) are substituted into the equations (2), (2)' and (2)' to find a, b and c, $$a = \frac{DF3 + DL2 - DF2}{(TM1 + TM2) \cdot TM2} + \frac{DF1 - DL1 - DF2}{(TM1 + TM2) \cdot TM1} \tag{5}$$

$$b = \frac{DF2 + DL1 - DF1 - a \cdot TM1^2}{TM1} \tag{6}$$

$$c = DF1. \tag{7}$$

Consequently, the amount of lens driving DL3 as converted into the amount of movement of the image plane at the time $t_4$ is:

$$\begin{aligned} DL3 &= f_4 - l_3 \\ &= f_4 - (f_3 - DF3) \\ &= a \cdot (TM1 + TM2 + TM3)^2 + b(TM1 + \\ & \quad TM2 + TM3) + c - \{a(TM1 + TM2)^2 + \\ & \quad b(TM1 + TM) + c\} + DF3 \\ &= a\{(TM1 + TM2 + TM3)^2 - (TM1 + \\ & \quad TM2)^2\} + b \cdot TM3 + DF3. \end{aligned} \tag{8}$$

Here, TM3 is assumed as known in the relation that TM3=TM2 as previously described, and DL3 is found from the equation (8).

The amount of lens driving at $t_n$ after the time $t_4$ can likewise be found from the past three detected defocus amounts $DF_{n-2}$, $DF_{n-1}$ and $DF_n$, the past two actual amounts of lens driving $DL_{n-2}$ and $DL_{n-1}$ and the past two time intervals $TM_{n-2}$ and $TM_{n-1}$.

$$a_n = \frac{DF_n + DL_{n-1} - DF_{n-1}}{(TM_{n-2} + TM_{n-1})TM_{n-1}} + \frac{DF_{n-2} - DL_{n-2} - DF_{n-1}}{(TM_{n-2} + TM_{n-1})TM_{n-2}} \tag{8}$$

$$b_n = \frac{DF_{n-1} + DL_{n-2} - DF_{n-2} - a \cdot TM_{n-2}^2}{TM_{n-2}} \tag{9}$$

$$DL_n = a_n \cdot \{(TM_{n-2} + TM_{n-1} + TM_n)^2 - (TM_{n-2} + TM_{n-1})^2\} + b_n \cdot TM_n + DF_n \tag{10}$$

If in accordance with the equations (8), (9) and (10), the defocus amount $DL_n$ for effecting lens driving is found from the detected defocus amount $DF_n$ and lens driving is effected, proper focusing even to a moving object will always become possible when lens driving is completed.

Now, the operation when the release operation has taken place during such automatic focus adjustment control will be described with reference to FIGS. 3 and 4 of the accompanying drawings.

FIG. 3 shows a case where the release operation has taken place at a time $t_{x1}$ under the situation that focus detection is started at a time $t_n$ and lens driving of $DL_n$ is effected at $t_n'$ and lens driving is completed at $t_{n+1}$. Here, the time from after the release operation has taken place until film exposure is actually effected, i.e., the so-called release time lag, is TR. Thus, in the figure, film exposure is effected at a time $t_{x1}+TR$. In the case where lens driving is stopped simultaneously with the taking-place of the release operation, the position $l_{x1}$ of the image plane of the lens at the time $t_{x1}$ is the position $l_{r1}$ of the image plane of the lens at the time $t_{x1}+TR$ and at this time, the image plane of the object lies at $f_{r1}$ and therefore, the object image exposed on the film suffers from defocus, i.e., out-of-focus, of $f_{r1}-l_{r1}=d_{x1}$.

In the case where lens driving is continued even if the release operation takes place, $l_{n+1}$, is reached at the time $t_{n+1}$, and the position of the image plane of the lens at the time $t_{x1}+TR$ is $l_{r1}'$, and although small in amount, out-of-focus of $f_{r1}-l_{r1}'=d_x'$ still occurs.

FIG. 4 shows a case where the release operation has taken place during lens driving. As in the case of FIG. 3, when lens driving is stopped simultaneously with the release operation, out-of-focus of $f_{r2}-l_{r2}=d_{x2}$ occurs, and when lens driving is terminated simultaneously with the release operation, out-of-focus of $f_{r2}-l_{r2}'=d_{x2}'$ occurs.

A description will now be given of a correction method which takes a uniform release time lag into account. In this case, the time $t_{n+1}$ can be considered to extend by an amount corresponding to the release time lag TR and therefore, the equation (10) is modified as follows:

$$DL_n = a_n \cdot \{(TM_{n-2} + TM_{n-1} + TM_n + TR)^2 - (TM_{n-2} + TM_{n-1})^2\} + b_n \cdot (TM_n + TR) + DF_n \quad (11)$$

FIG. 5 of the accompanying drawings shows the control method of the above equation (11). Curve f'(t) indicated by a dot-and-dash line represents the position of the image plane of the object which takes the uniform release time lag TR into account, and the lens can be controlled so as to be along this curve. Accordingly, the object in the viewfinder always becomes out of focus by an amount corresponding to the release time lag. Assuming that as in FIG. 3, the release operation has taken place at the time $t_{x1}$, if lens driving is stopped, the position of the image plane of the lens is $l_{r1}$ at the time $tx1+TR$ and the actual position of the image plane of the object is $f_{r1}$ and therefore, out-of-focus of $f_{r1}-l_{r1}=d_{x1}$ occurs. When lens driving is terminated, out-of-focus of $f_{r1}-l_{r1}'=d_{x1}'$ occurs. FIG. 6 of the accompanying drawings shows a case where the release operation has taken place during lens driving, and if lens driving is stopped simultaneously with the release operation, out-of-focus of $f_{r2}-l_{r2}=d_{x2}$ occurs, and if lens driving is terminated simultaneously with the release operation, out-of-focus of $f_{r2}-l_{r2}'=d_{x2}'$ occurs.

As described above, even in the aforedescribed method which takes the release time lag into account, more or less out-of-focus remains depending on the timing of the release, but considerably good correction can be accomplished and this method sufficiently provides practical use. However, in the above-described correction method, it is assumed when DL3 is found in the equation (8) that the next focus detecting operation time interval TM3 is equal to the past focus detecting operation time interval TM2, but TM3 and TM2 consist of the defocus calculation time and the lens driving time, and although the defocus calculation time is substantially invariable, the lens driving time differs depending on the amount of lens driving and therefore, it cannot simply be assumed that TM3=TM2. Consequently, assuming that TM3=TM2, an error occurs to the foreseeing of the time when lens driving is completed and as a result, a correction error occurs. This phenomenon will now be described in detail with reference to the drawings.

FIG. 7 newly depicts the state of the first and subsequent focus detecting operations when the correction system shown in FIG. 5 or 6 is applied. In this figure, an ideal state in which the lens driving time does not depend on the amount of driving but is assumed to be always constant is assumed.

From the defocus amounts DF1, DF2 and DF3 obtained at times $t_1$, $t_2$ and $t_3$, the amounts of lens driving DL1 and DL2 and TM1 and TM2, $a_3$ and $b_3$ are determined by the use of the equations (8) and (9) and DL3 is calculated by the use of the equation (11), and if lens driving is effected thereafter, the lens arrives at $l_4$ at a time $t_4$. When the release signal comes at this point of time, release takes place after TR, and since at this time, the image plane of the object is at $f_{r4}$, it coincides with the lens position $l_4$ and a photograph which is in focus can be taken. If the release signal does not come, the aforedescribed focus detecting operation cycle is repeated and the lens positions after the fourth and fifth focus detecting operations are $l_5$ and $l_6$, respectively.

However, the amount of lens driving DL3 is considerably great relative to DL2 and in the actual lens, the time required for driving the lens by DL3 unavoidably becomes longer than the time required for driving the lens by DL2 and accordingly, the true TM3 ought to be longer than what is estimated as TM3=TM2.

Likewise, comparing DL3 with DL4, DL4 is considerably smaller than DL3 and therefore, again, if it is assumed that TM4=TM3, an estimation error occurs to TM4. FIG. 8 shows that state.

From the defocus amounts DF1, DF2 and DF3 obtained at the times $t_1$, $t_2$ and $t_3$ and the amounts of lens driving DL1 and DL2, $a_3$ and $b_3$ are determined by the use of the equations (8) and (9), and on the assumption that TM3=TM2, the amount of lens driving DL3 to the position $f_{r4}$ of the image plane of the object which takes the release time lag TR into account is calculated by the use of the equation (11). Then, lens driving is started from $t_3'$. At this time, the lens is expected to arrive at $l_4$, but since DL3 is great relative to DL2, more time than estimated at first is required and the lens arrives at $l_4'$ at the time $t_4$. Consequently, a deviation of $d_{x4}$ occurs relative to the target position f'(t) at the time $t_4$.

When the next focus detection is effected at the time $t_4$ and the defocus amount DF4 is obtained, the focus detection time interval is now assumed to be TM4=TM3'. That is, the real value TM3' of the last interval is utilized. Then, the position $f_{r5}$ of the image plane of the object which takes TR into account is foreseen and driving by DL4 is effected. Now that DL3<DL4, driving is completed in a time shorter than estimated at first and that time is $t_5$. At this time, a deviation of $d_{x5}$ occurs.

As described above, the amount of lens driving differs each time, and particularly before and after corrected driving is entered, a great variation occurs to the amount of driving. Consequently, from the difference in the lens driving time, an estimation error occurs to the focus detection time error and as a result, correction accuracy is somewhat reduced.

SUMMARY OF THE INVENTION

The present invention is concerned with improvements in an automatic focus adjusting device using the above-described foreseeing calculation of the amount of lens driving, which foresees accurately the time required for the next lens driving foresees the amount of lens driving on the basis of this foreseen time and as a result, enables automatic focus adjustment in which the accuracy of correction of the out-of-focus attributable to movement of an object is enhanced.

One aspect of the application is to provide a focus adjusting device in which the amount of lens driving for making an object in focus after a predetermined time on the basis of the result of the past focus adjustment is calculated with the result of said past focus adjustment and said predetermined time as factors and in which a lens driving time conforming to said calculated amount of lens driving is calculated, said predetermined time is determined on the basis of said lens driving time and said amount of lens driving is again calculated by the use of said predetermined time to thereby effect accurate lens driving.

One aspect of the application is to provide a focus adjusting device in which the amount of lens driving for making an object in focus after a predetermined time on the basis of the result of the past focus adjustment is calculated with the result of said past focus adjustment and said predetermined time determined with a lens driving time taken into account as factors.

Other objects of the present invention will become apparent from the following detailed description of an embodiment thereof taken in conjunction with the accompanying drawings.

DESCRIPTION OF THE PREFERRED EMBODIMENTS

Figure 9:
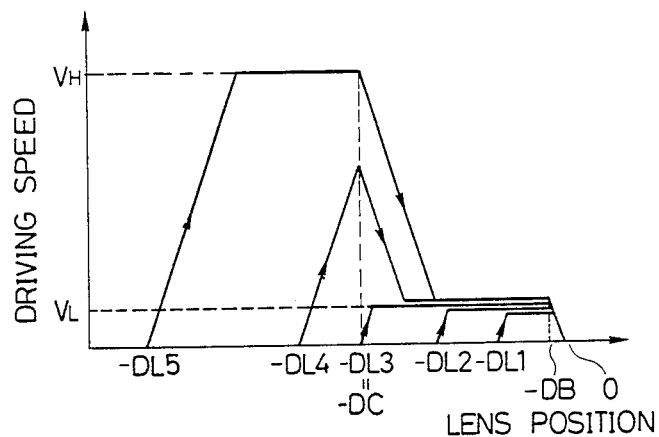
FIGS. 9 to 11 show an example of the lens driving control method adopted in the present invention.
Figure 10:
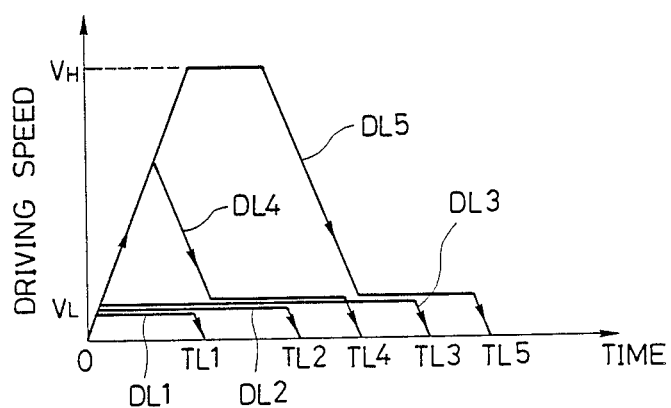
Figure 11:
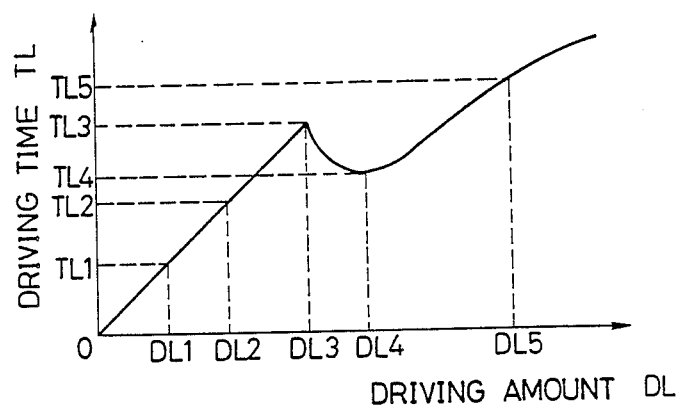

FIGS. 9 to 11 show an example of the lens driving control form used in the present invention.

FIG. 9 is a graph representing the amount of driving and the driving speed of the lens, and the horizontal axis of this graph represents the lens position for focus adjustment, and the scale is not the actual dimension in the direction of the optic axis, but is converted into the amount of movement of the focus (the defocus amount) on the image plane. The point O is the target position at which the lens is stopped, and the predetermined amounts of lens driving DL1–DL5 are shown at the left of the point O. The vertical axis represents the driving speed of the lens and this also is converted into the speed of movement of the focus on the image plane.

In FIG. 9, when the lens is to be driven by DL1, the lens is at a position $-DL1$ at first and rises from this position to a speed $V_L$ in a short time, and is driven to a point $-DB$ at the constant speed $V_L$, whereafter a brake is applied to the lens so that the lens is stopped just at the point O (DB is the amount of overrun when the brake is applied while the lens is being driven at the speed $V_L$, and is an amount preset in accord with the characteristics of the lens).

This also holds true of the expected amounts of driving DL2 and DL3.

At DL4 whereat the expected amount of driving is greater than DL3=DC, the speed rises toward $V_H$, but at a point whereat the remaining amount of driving becomes DC, the speed is decelerated toward $V_L$, whereafter the lens is driven at $V_L$ for a while, and then the brake is applied to the lens at a point $-DB$ and the lens is stopped at the point O.

At DL5 whereat the expected amount of driving is considerably greater than DC, the lens reaches the speed $V_H$, whereafter the lens is driven at $V_H$ for a while, and at $-DC$, the lens is controlled toward $V_L$, and thereafter the situation is similar to that in the case of DL4.

The reason why the two kinds of speeds $V_L$ and $V_H$ are thus suitably changed over is that in order to improve the accuracy of stoppage of the lens, it is necessary to drive the lens at a low speed immediately before the lens is stopped and on the other hand, it is necessary to drive the lens at a high speed so that the driving time may not be immoderately prolonged when the expected amount of driving is great, and the method shown in the assignee's Japanese Patent Application No. 62-4593 etc. can be applied as a control method whereby such a lens driving control form is realized, and description of the details thereof is omitted herein.

FIG. 10 shows the relations of time and speed to said expected amounts of driving DL1–DL5. In the case of DL1, DL2 or DL3, the lens is driven at the predetermined speed $V_L$ and therefore, the time when driving is completed, i.e., the driving time, is substantially proportional to DL. In this graph, the area of the portion encircled by a trapezoid in the driving locus (DL1–DL3) corresponds to the amount of driving DL.

In the case of DL4, the speed rises toward $V_H$, but in the course thereof, the speed is decelerated and the lens is driven at $V_L$ and driving is completed at TL4. In spite of the fact that DL4>DL3 at this time, TL4<TL3. The reason why a time shorter than TL3 is required is that the area encircled by the first triangular locus of DL4 is great, that is, most of the amount of driving is consumed during the first half of the whole driving time.

In the case of DL5, the lens is driven at $V_H$ for a while, whereafter the lens is driven at $V_L$ and is stopped at TL5.

FIG. 11 sums up the relation between the (expected) amount of driving DL and the time required for driving, on the basis of the above-described result.

When $DL \leq DC$, the amount of driving DL and the driving time TL are in a substantially proportional relation. The time when DL is slightly greater than DC corresponds to a transition period during which the speed is changed over from $V_L$ to $V_H$ and therefore, this is an area in which DL becomes great, but the driving time becomes short. In an area wherein DL is considerably greater than DC, TL is again increased with an increase in DL. Where the lens driving control shown in FIGS. 9-11 is effected, when the focus detecting operation cycle is repetitively performed, the amount of lens driving at each time is relatively small and the lens driving is in the area of $DL < DC$ and therefore, TL can be regarded as $$TL = k \cdot DL \text{ (k being a constant).} \tag{12}$$

Figure 12:
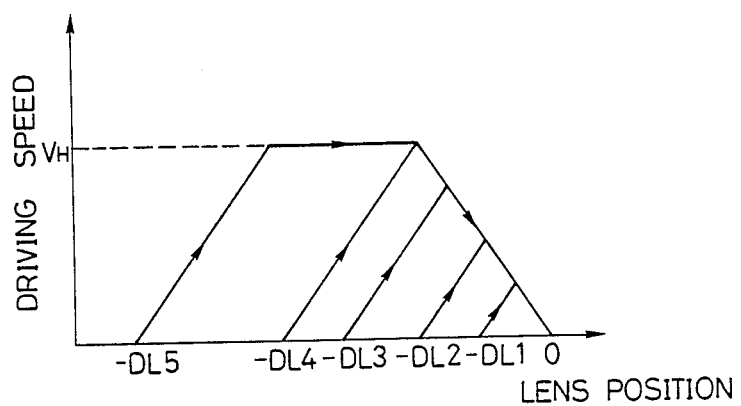
FIGS. 12 to 14 show another example of the lens driving control method.
Figure 13:
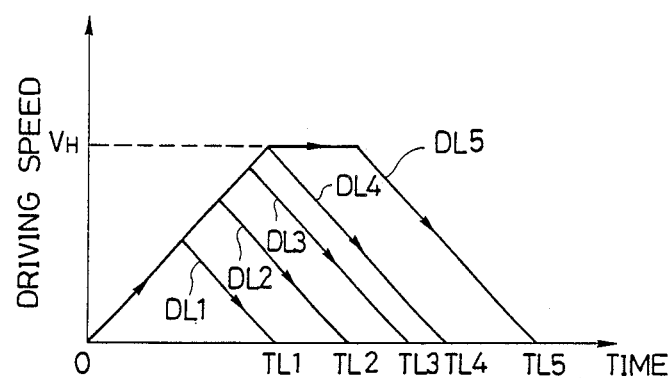
Figure 14:
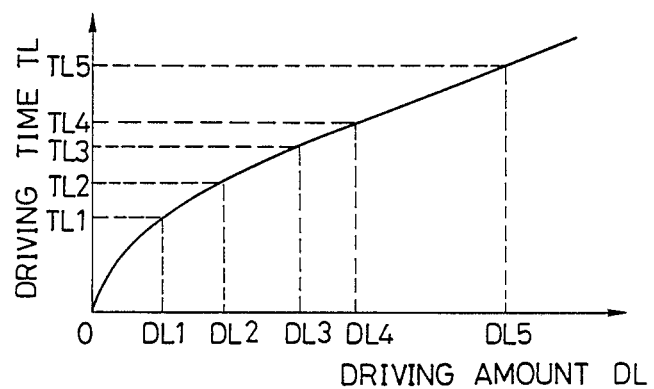

FIGS. 12 to 14 show another example of the lens driving form.

Referring to FIG. 12, in this lens control method, the driving speed is designed to increase and decrease at a certain function relative to the lens position. That is, the program is made such that when the expected amount of driving is DL1 to DL4, the amount of driving is monitored and the speed increases as driving progresses, and the speed decreases at a certain point. Also, at DL5, when the speed reaches its upper limit value $V_H$, the speed increases no more and the lens is driven at a constant speed and begins to be decelerated at a certain point.

FIG. 13 shows the relation between time and speed. In this figure, the locuses of DL1-DL4 are similar, and it is seen that when the area of the triangular locus becomes n times greater, the driving time becomes $\sqrt{n}$ times longer. If in FIG. 12, the locus of the acceleration and deceleration process is straight, it is strictly not straight in FIG. 13, but here, any great error will not occur even if it is regarded as straight.

FIG. 14 shows the relation between the amount of driving and the driving time, and in an area wherein DL is smaller than DL4, $$TL = m \cdot \sqrt{DL} \text{ (m being a constant).} \tag{13}$$

When $DL > DL4$, DL is proportional to TL, but DL is still smaller. That is, in the case of DL4 or less, only the equation (13) may be substituted for.

Thus, in the two kinds of driving forms, the lens driving time can be specified by the amount of driving.

The load of the driven portion and the characteristic of the motor differs from lens to lens and correspondingly, the reduction gear ratio, etc. also differ and therefore, the constants in the equations (12) and (13) above differ from lens to lens. Accordingly, to foresee the lens driving time, it is necessary to know the parameter k or m of each lens in addition to the control method for that lens. Also, in the case of a single lens of invariable focal length, k or m is invariable in any case with respect to that lens, but in the case of a zoom lens, k or m fluctuates by zooming. That is, usually, when zooming is effected, the amount of movement of the focus is proportional to about the square of the focal length ratio, relative to the unit amount of movement of the focusing lens group and therefore, even if the rotational speed of the motor is the same, the moving speed of the focus is greater as the focal length is greater. That state is shown in FIGS. 15 and 16.

Figure 15:
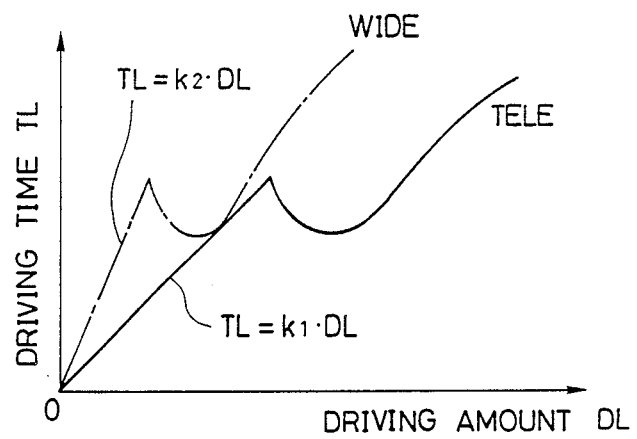
FIGS. 15 and 16 illustrate the relation of the lens driving control method shown in FIGS. 9–11 or 12–14 with the zoom ratio.
Figure 16:
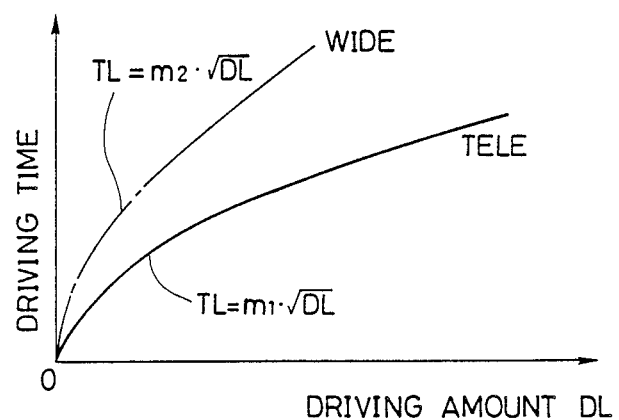

FIG. 15 corresponds to the control system described with reference to FIGS. 9-11, and FIG. 16 corresponds to the control system described with reference to FIGS. 12-14. In these figures, a zoom lens is supposed, and the solid line indicates the amount of lens driving as converted into the in-focus position on the Tele side and the driving time, and the dot-and-dash line indicates the amount of lens driving as converted into the in-focus position on the Wide side and the driving time. That is, in any of these figures, a longer driving time is required for the same amount of driving on the Wide side than on the Tele side and therefore, k or m becomes greater by zooming toward the Wide side. Accordingly, to foresee said lens driving time accurately, in the case of a zoom lens, k and m must be changed over in conformity with the focal length and therefore, in the ROM in the lens, it is necessary that the k or m value conforming to each zone resulting from multi-driving the zoom area be selected in conformity with a set zoom ratio or be corrected by the following method.

That is, the method of FIGS. 9-11 is adopted as the lens driving control method, and the past amount of driving in that case is DLL, the driving time therefor is TLL, the current expected amount of driving is DL and the expected driving time therefor is TL, and by applying these to the equation (12), there are obtained the following equations:

$$TLL = k \cdot DLL \tag{14}$$

$$TL = kDL \tag{15}$$

Consequently, if k is eliminated from the above two equations, there is obtained the following equation:

$$TL = TLL \cdot \frac{DL}{DLL} \tag{16}$$

Also, where the method of FIGS. 12-14 is adopted as the lens driving control method and the driving time is foreseen by the use of the equation (13), from $$TLL = m \cdot \sqrt{DLL} \tag{17}$$

$$TL = m \cdot \sqrt{DL} \tag{18}$$

the following equation is likewise obtained:

$$TL = TLL \cdot \sqrt{\frac{DL}{DLL}} \tag{19}$$

After all, if the past amount of driving and the actual driving time are known, the next driving time can be accurately foreseen without knowing the values of k and m in any of the two control systems.

Figure 17:
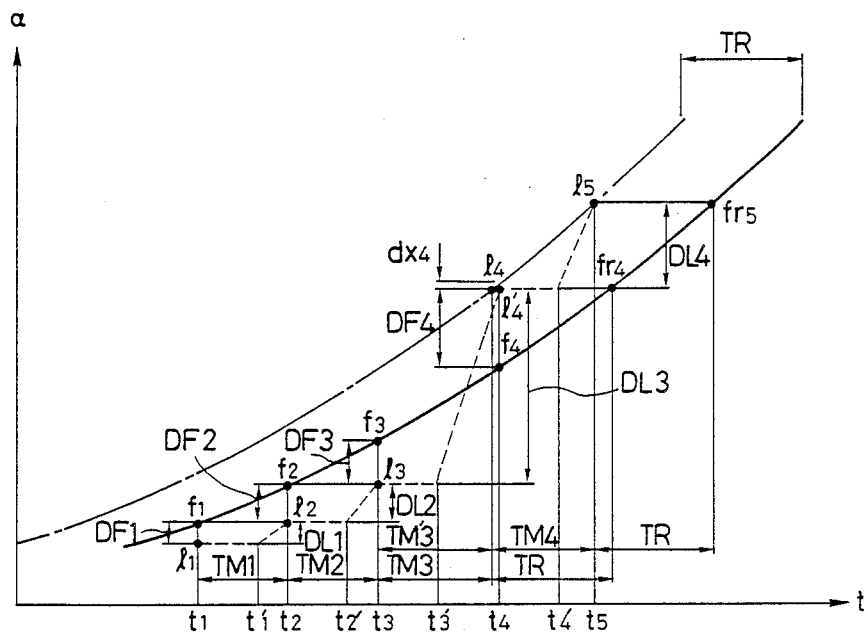
FIG. 17 illustrates the focus adjusting operation using the foreseeing lens driving system according to the present invention.

FIG. 17 illustrates the lens driving correction method in the present invention using the lens driving time foreseeing method shown in the equations (16) and (19) above.

Let it be assumed that the defocus amounts obtained at the times $t_1$, $t_2$ and $t_3$ in the first to third focus detecting operation cycles are DF1, DF2 and DF3, the amounts of lens driving in the first and second focus detecting operation cycles are DL1 and DL2 and further, the focus detection time intervals are TM1 and TM2. The coefficients $a_3$ and $b_3$ of the foreseeing calculation are calculated from the equations (8) and (9) by the use of these data. Also, it is assumed that TM3=TM2, and from the equation (11), the amount of driving $DL3_1$ (=DL3) to the position of the image plane of the object at the point of time whereat exposure is started is found by the above-described foreseeing calculation. This $DL3_1$ represents the defocus amount from the position of the image plane of the object at the time $t_3$ to the position of the image plane of the object at the point of time TM3+TR, but since in the equation (11), it is assumed that TM3=TM2, $DL3_1$ is not indicative of a right value as described above. So, if by the use of the equation (16), TL3 which is $$TL3_1 = TL2 \cdot \frac{DL3_1}{DL2} \quad (20)$$

$$\left( \begin{array}{ll} \text{where} & TL2: \text{ the last actual lens driving time} \\ & DL3_1: \text{ the foreseen defocus amount} \\ & \quad \text{(the amount of lens driving)} \\ & DL2: \text{ the last actual amount of lens} \\ & \quad \text{driving} \end{array} \right)$$

is found, this is the time foreseen in the next lens driving and therefore, after all, new TM3 is expressed as $$TM3_1 = TM2 + (TL3_1 - TL2). \quad (21)$$

Consequently, if by the use of this $TM3_1$, new $DL3_2$ is again found from the equation (11), a more accurate value can be found for $DL3_1$.

If the above-described calculation is repeated n times, the values of $DL3_1 \rightarrow TL3_1 \rightarrow TM3_1 \rightarrow DL3_2 \rightarrow TL3_2 \rightarrow TM3_2 \rightarrow \ldots \rightarrow DL3_n \rightarrow TL3_n \rightarrow TM3_n \rightarrow DL3_{n+1}$ are found in succession, and if the last $DL3_{n+1}$ is used as the next expected amount of lens driving, an accurate amount of lens driving DL3 can be found. The greater is n, the more is increased the accuracy of DL3, but if the number n, i.e., the frequency of said repeated calculation, is great, the calculation time becomes long and therefore, n is suitably determined by the equilibrium between the necessary accuracy of DL3 and the calculating speed of the microcomputer.

Figure 8:
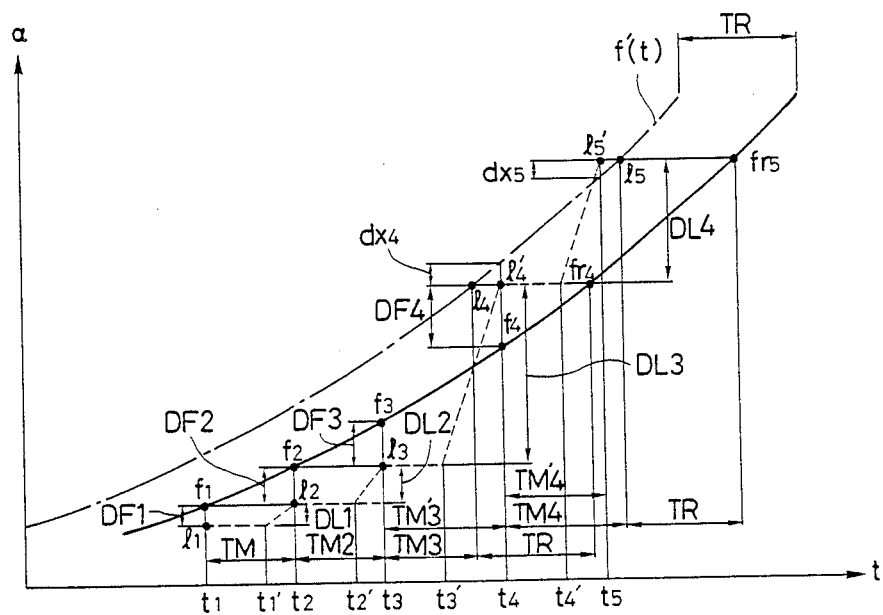

The focus detecting operation cycle time TM3 and the amount of lens driving DL3 of FIG. 17 are indicative of the foreseen time interval $TM3_n$ and the foreseen amount of driving $DL3_{n+1}$ found by the above-described calculation. In the example shown, there is shown a case where as a result of the lens driving based on said $DL3_{n+1}$ having been effected, the focus detection interval is not the foreseen TM3 ($TM3_n$), but actually is TM3', and the out-of-focus $d_{x4}$ at this time is greatly improved as compared with that of FIG. 8.

The next focus detection cycle likewise calculates TM4 and DL4, and indicates that $l_5$ is arrived at at a time $t_5$.

As described above, in the present invention, when the amount of lens driving $DL_n$ is to be foreseeing-calculated by the foreseeing calculation of the equation (11), the lens driving time for the amount of lens driving $DL_n$ is foreseen from the equation (16) or (19) and the current focus detecting operation cycle time is newly set, and the amount of lens driving $DL_n$ conforming to this foreseen lens driving time is re-calculated from the equation (11) above and therefore, accurate foreseen lens driving can be accomplished.

Figure 18A:
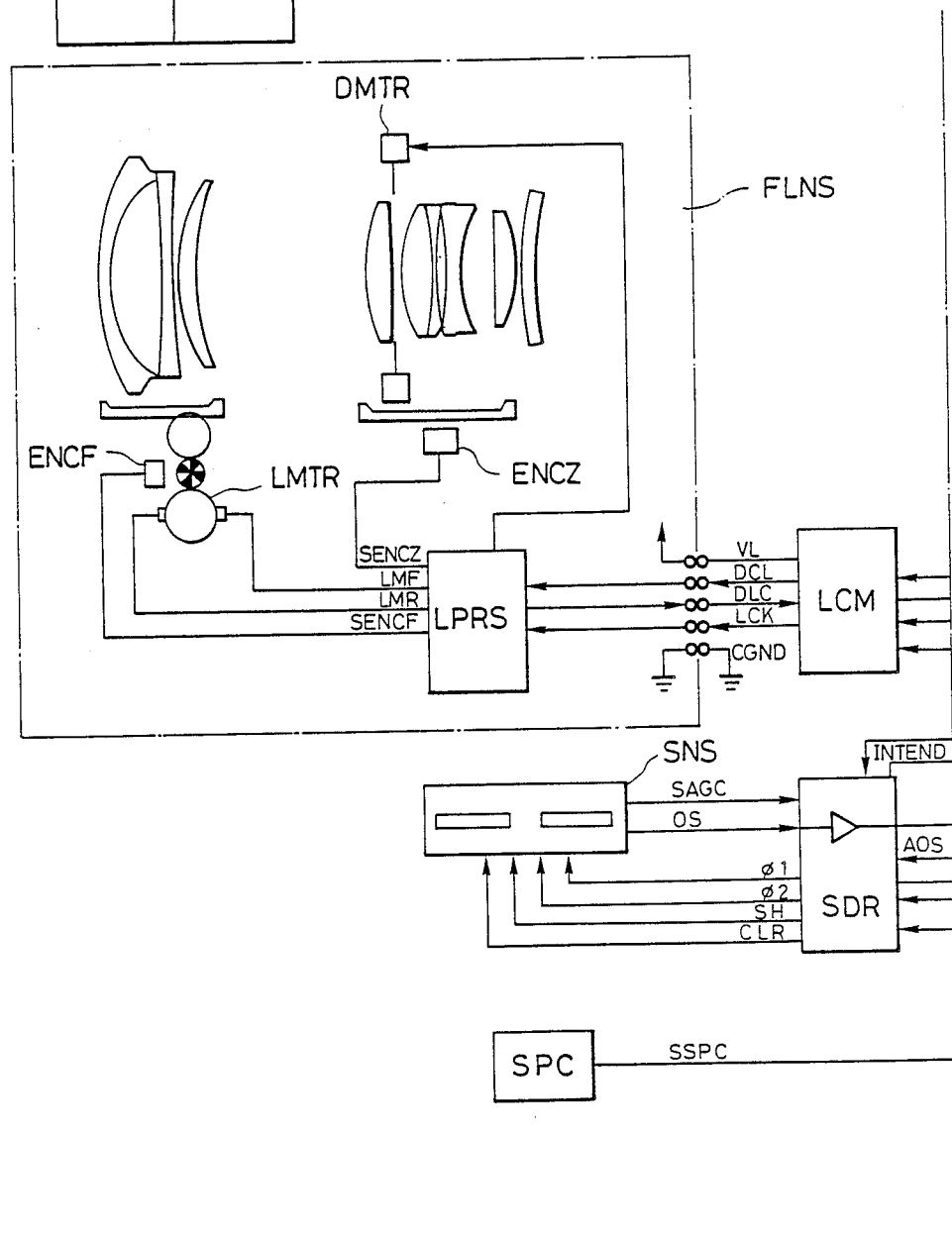
FIG. 18 is a circuit diagram showing an embodiment of a camera having the automatic focus adjusting device according to the present invention.
Figure 18B:
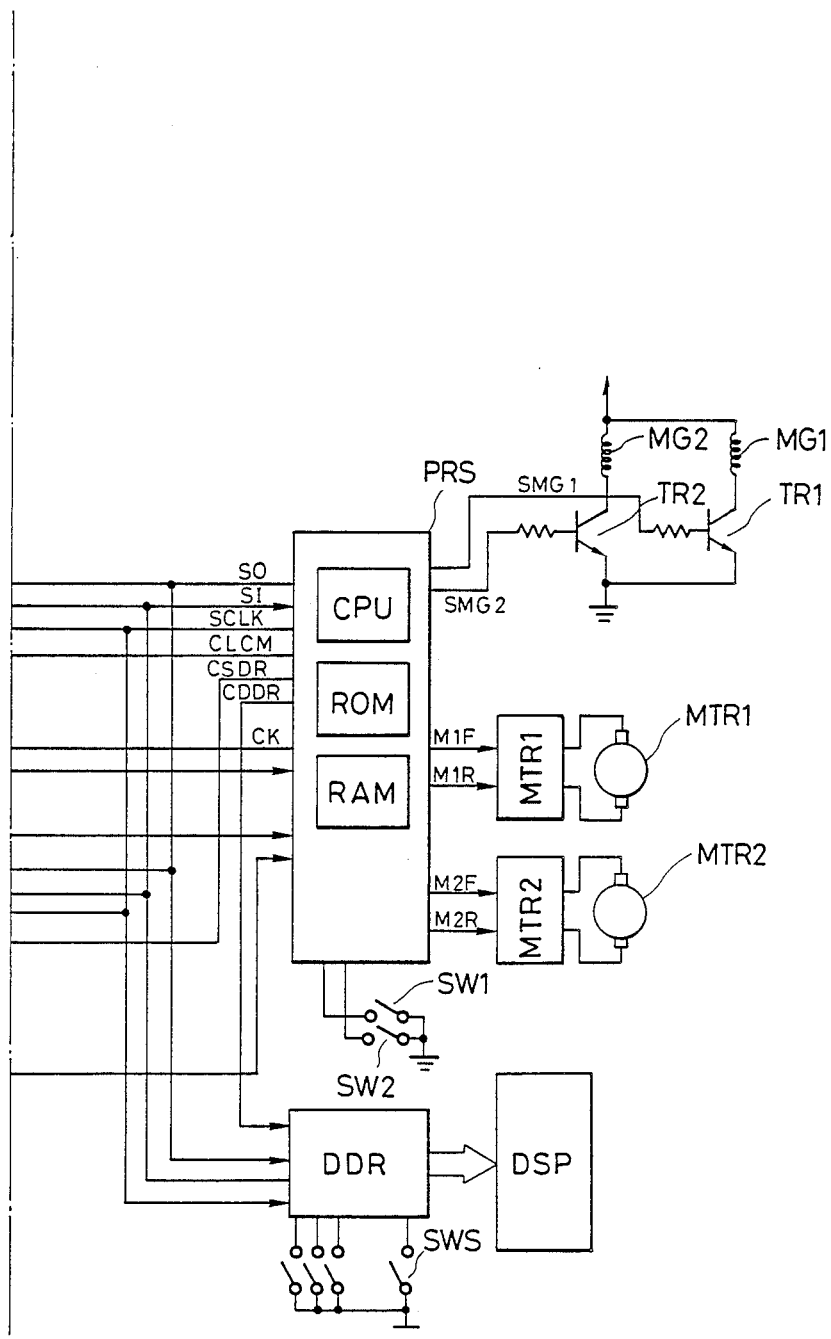

FIG. 18 is a circuit diagram showing an embodiment of a camera provided with the automatic focus adjusting device according to the present invention.

In FIG. 18, PRS designates a control device for the camera, for example, a 1-chip microcomputer having a CPU (central processing unit), a ROM, a RAM and an A/D converting function therein. The computer PRS effects a series of operations of the camera such as the automatic exposure controlling function, the automatic focus detecting function and the winding-up of a film in accordance with the sequence program of the camera stored in the ROM. For that purpose, the computer PRS uses synchronizing type communicating signals SO, SI and SCLK and communication selection signals CLCM, CSDR and CDDR to communicate with the surrounding circuits in the camera body and the lens and control the operations of each circuit and the lens.

SO is a data signal output from the computer PRS, SI is a data signal input to the computer PRS, and SCLK is a synchronizing clock for the signals SO and SI.

LCM denotes a lens communication buffer circuit which supplies electric power to the power source terminal for the lens when the camera is operating, and which provides a communication buffer between the camera and the lens when the selection signal CLCM from the computer PRS is at a high potential level (hereinafter referred to as 'H').

When the computer PRS renders CLCM into 'H' and delivers predetermined data from SO in synchronism with SCLK, the buffer circuit LCM outputs buffer signals LCK and DCL for SCLK and SO, respectively, to the lens through the contact between the camera and the lens. Simultaneously therewith, the buffer circuit LCM outputs a buffer signal for the signal DLC from the lens to SI, and the computer PRS receives the data of the lens as an input from SI synchronism with SCLK.

SDR designates a driving circuit for a line sensor device SNS for focus detection comprised of a CCD or the like. The driving circuit SDR is selected when the signal CSDR is at 'H', and is controlled from the computer PRS by the use of SO, SI and SCLK.

Signal CK is a clock for producing CCD driving clocks $\phi 1$ and $\phi 2$, and signal INTEND is a signal for informing the computer PRS that the accumulating operation has been completed.

The output signal OS of the sensor device SNS is a time-serial image signal synchronized with the clocks $\phi 1$ and $\phi 2$, and is amplified by an amplifier circuit in the driving circuit SDR, and is output as AOS to the computer PRS. The computer PRS receives AOS as an input from the analog input terminal thereof, and A/D-converts it by the A/D converting function therein in synchronism with CK, and thereafter stores it at the predetermined address of the RAM.

Signal SAGC which also is the output signal of the sensor device SNS is the output of an AGC (auto gain control) sensor in the sensor device SNS, and is input to the driving circuit SDR for use for the accumulation control of the sensor device SDR.

SPC denotes a photometric sensor for exposure control which receives the light from the object passed through the photo-taking lens, and the output SSPC thereof is input to the analog input terminal of the computer PRS and is A/D-converted, whereafter it is used for automatic exposure control (AE) in accordance with a predetermined program.

DDR designates a circuit for switch detection and display. The circuit DDR is selected when the signal CDDR is at 'H', and is controlled from the computer PRS by the use of SO, SI and SCLK. That is, it changes over the display on the display member DSP of the camera on the basis of data sent from the computer PRS, and informs the computer PRS of the ON or OFF state of the various operating members of the camera by communication.

Switches SW1 and SW2 are switches operatively associated with a release button, not shown, and the switch SW1 is closed by the first-stage depression of the release button, and subsequently the switch SW2 is closed by the depression of the release button to the second stage. The computer PRS, as will be described later, effects photometry and the automatic focus adjusting operation upon closing of the switch SW1, and effects exposure control and the winding-up of the film with the closing of the switch SW2 as a trigger. The switch SW2 is connected to the "interruption input terminal" of the microcomputer PRS, and even when the program during the closing of the switch SW1 is being executed, an is applied by the closing of the switch SW2 and a shift can be immediately made to a predetermined interruption program.

MTR1 designates a film feeding motor, and MTR2 denotes a motor for moving the mirror up and charging the down and shutter spring. These motors MTR1 and MTR2 are controlled for forward and reverse rotations by their respective driving circuits MDR1 and MDR2. Signals M1F, M1R, M2F and M2R input from the computer PRS to the driving circuits MDR1 and MDR2 are motor controlling signals.

MG1 and MG2 designate magnets for starting the movements of the forward and rearward shutter curtains. These magnets MG1 and MG2 are electrically energized by signal SMG1 and SMG2 and amplifying transistors TR1 and TR2, and shutter control is effected by the computer PRS.

The circuit DDR for switch detection and display, the motor driving circuits MDR1 and MDR2 and shutter control have no direct relation with the present invention and therefore need not be described in detail.

Signal DCL input to a control circuit LPRS in the lens in synchronism with LCK is command data from the camera to the lens FLNS, and the operation of the lens in response to the command is predetermined.

The control circuit LPRS analyzes the command in accordance with a predetermined procedure, and effects the focus adjusting and aperture controlling operations and the outputting of the various operating situations of the lens (how much the focus adjusting optical system has been moved, by how many steps the aperture is stopped down etc.) and various parameters (such as the full open F-number, the focal length, and the coefficient of the defocus amount vs. the amount of axial movement) from an output DLC.

An example of the zoom lens is shown in the embodiment, and when a command for focus adjustment has been sent from the camera, a motor LMTR for focus adjustment is driven by signals LMF and LMR in accordance with the amount and direction of driving sent at the same time, whereby the optical system is moved in the direction of the optic axis to thereby accomplish focus adjustment. The amount of movement of the optical system is monitored by the pulse signal SENCF of an encoder circuit ENCF and is counted by a counter in the control circuit LPRS, and at a point of time whereat predetermined movement has been completed, the control circuit LPRS itself renders the signals LMF and LMR into 'L' and brakes the motor LMTR.

Therefore, once the command for focus adjustment has been sent from the camera, the control device PRS in the camera need not at all be concerned in the movement of the lens until the driving of the lens is completed. The design is such that the content of said counter can be delivered to the camera as required.

When a command for aperture control has been sent from the camera, a conventional stepping motor DMTR is driven for aperture driving in accordance with the number of aperture steps sent at the same time.

ENCZ designates an encoder circuit attendant on the zoom optical system, and the control circuit LPRS receives as an input a signal SENCZ from the encoder circuit ENCZ and detects the zoom position. The lens parameters at each zoom position are stored in the control circuit LPRS, and a parameter corresponding to the current zoom position is delivered to the camera when there is a requirement from the control device PRS of the camera side.

Figure 19:
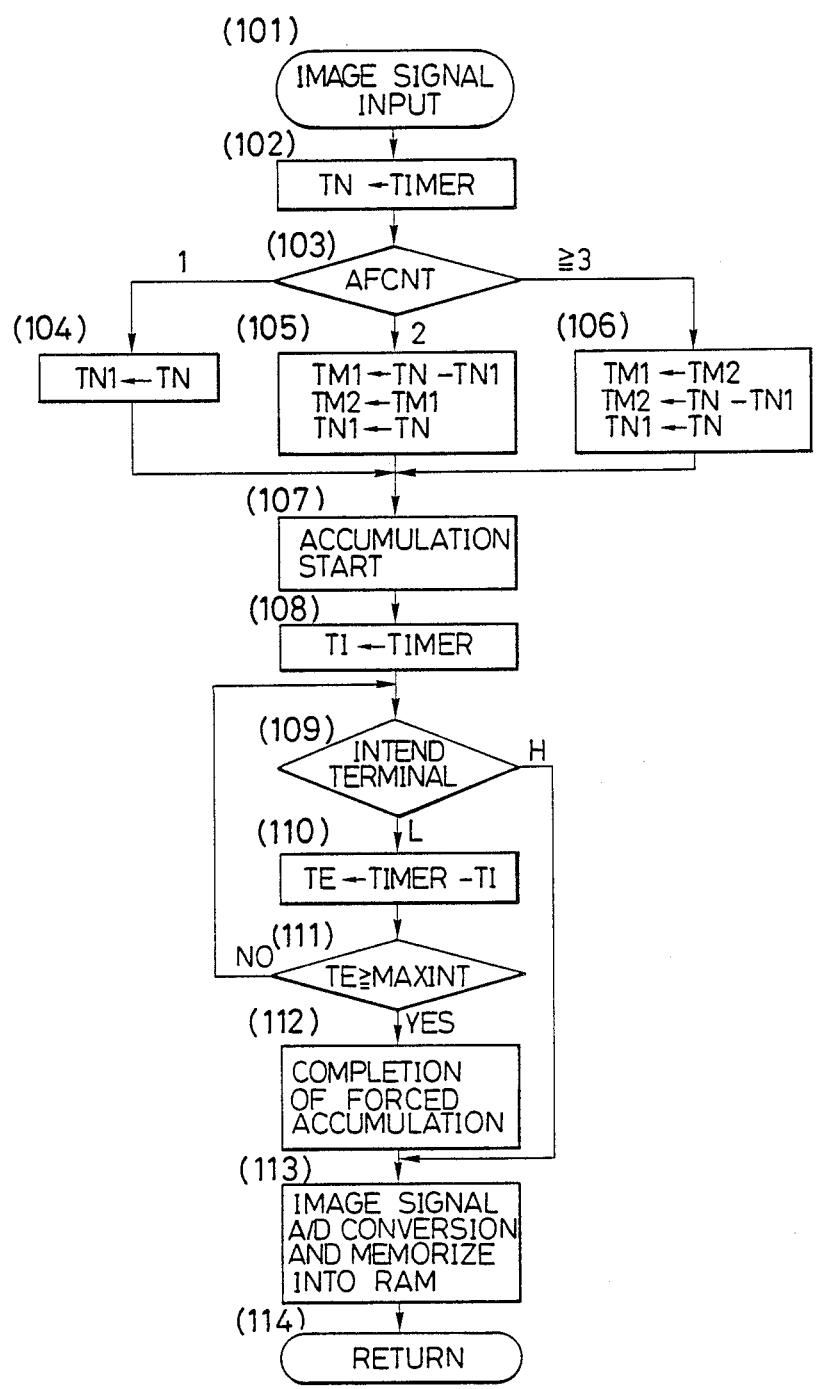
FIGS. 19 to 22 show flows for illustrating the subroutines in the flow of FIG. 1.

The operation of the camera of the above-described construction will now be described with reference to the flow charts of FIGS. 1 and 19 and so on.

When a power source switch, not shown, is closed, the supply of electric power to the microcomputer PRS is started, and the microcomputer PRS starts to execute the sequence program stored in the ROM.

Figure 1A:
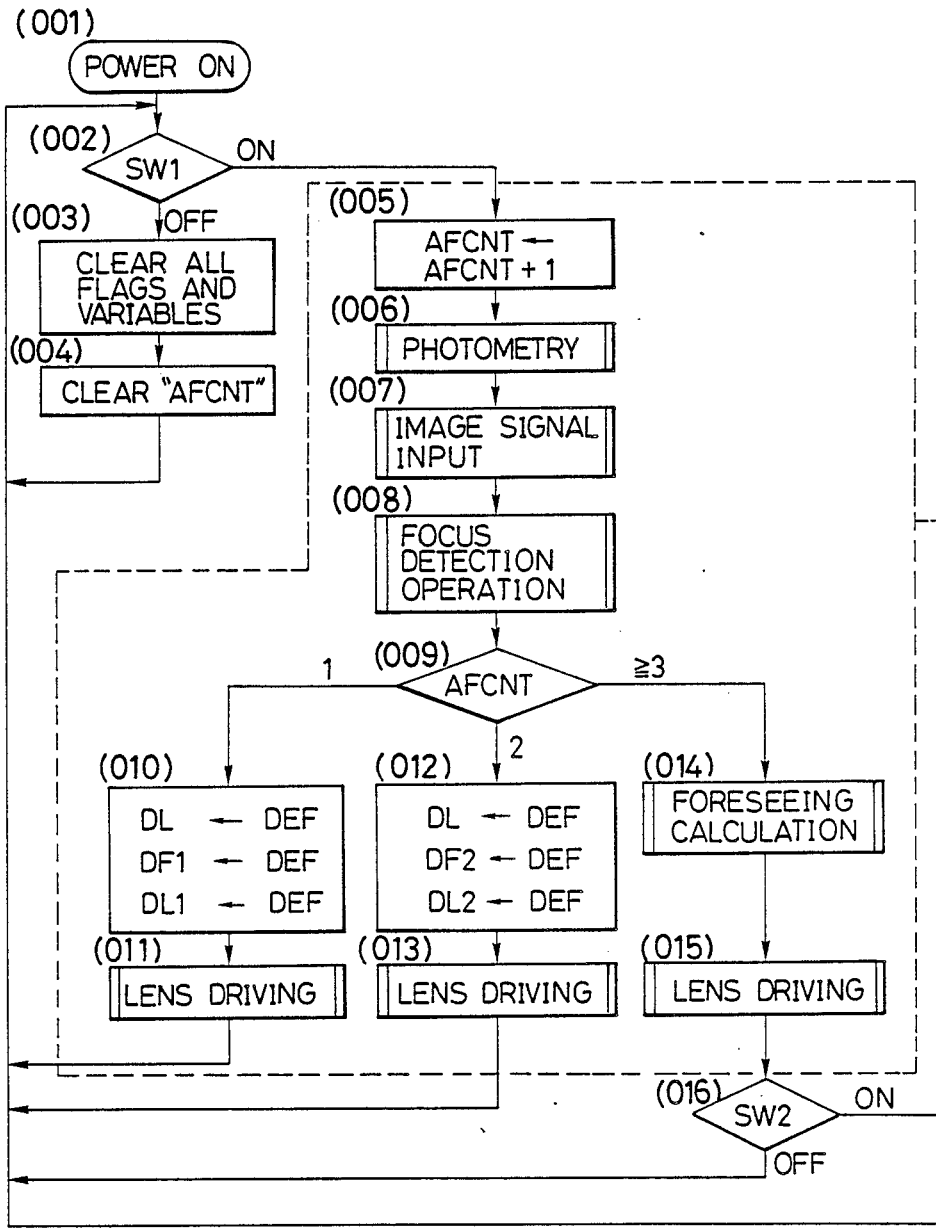
FIG. 1 shows a program flow illustrating the general operation of an automatic focus adjusting device according to the present invention.
Figure 1B:
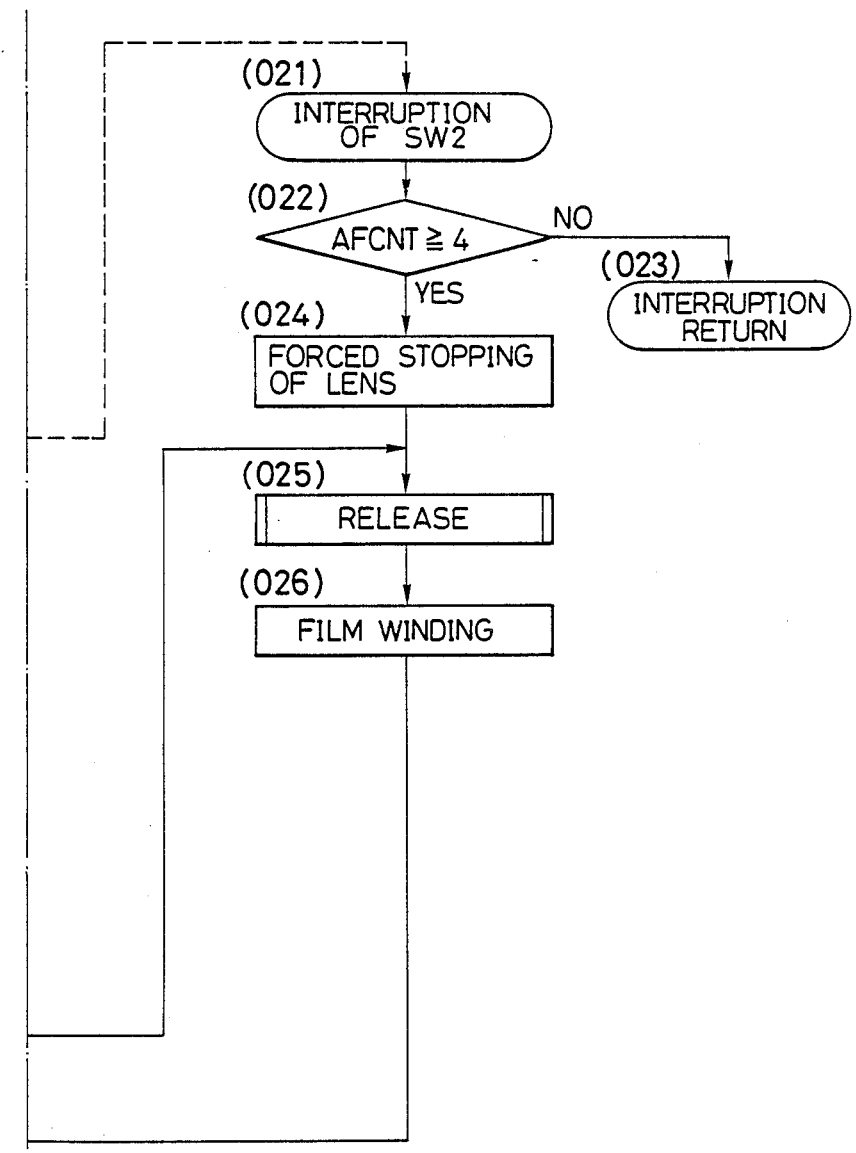
Figure 2:
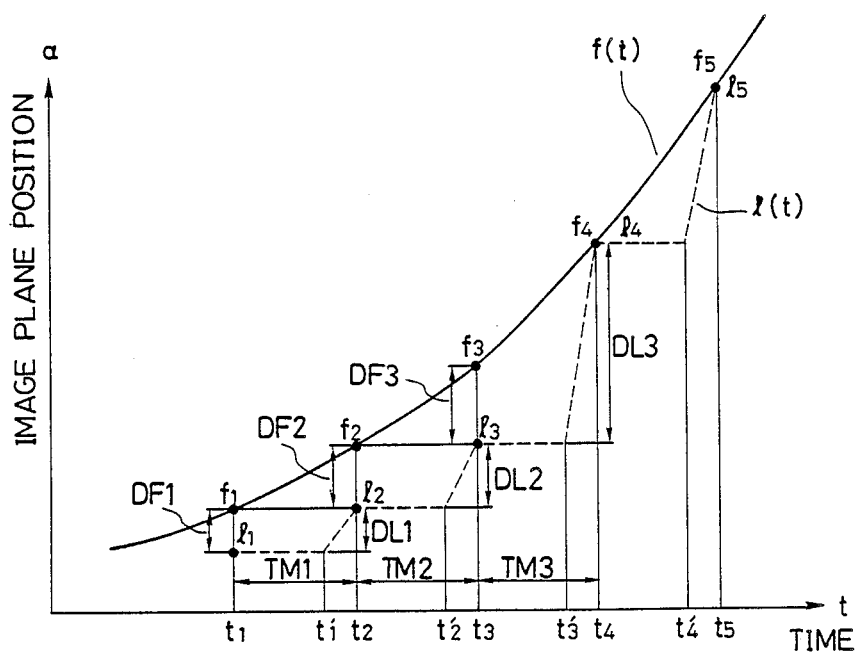
FIGS. 2 to 8 illustrate the principle of the foreseeing lens driving system.
Figure 3:
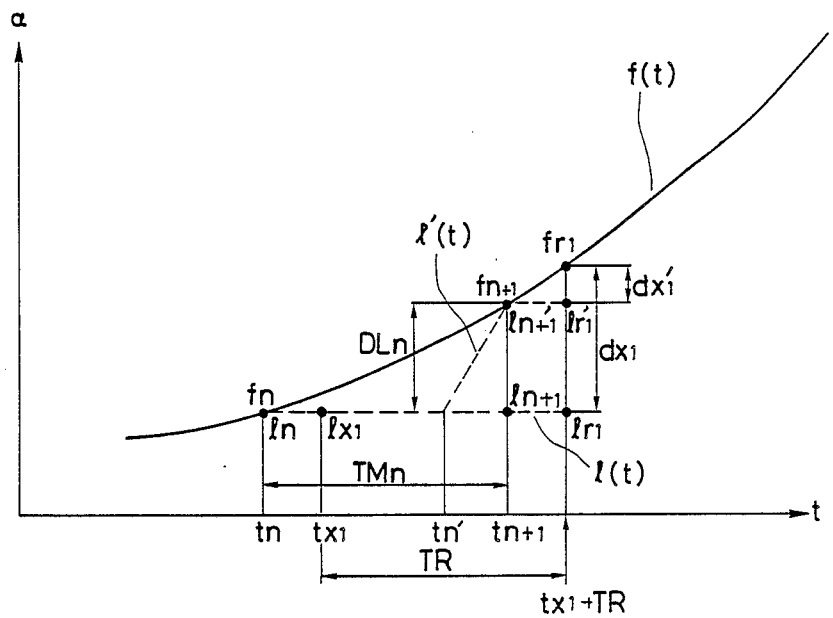
Figure 4:
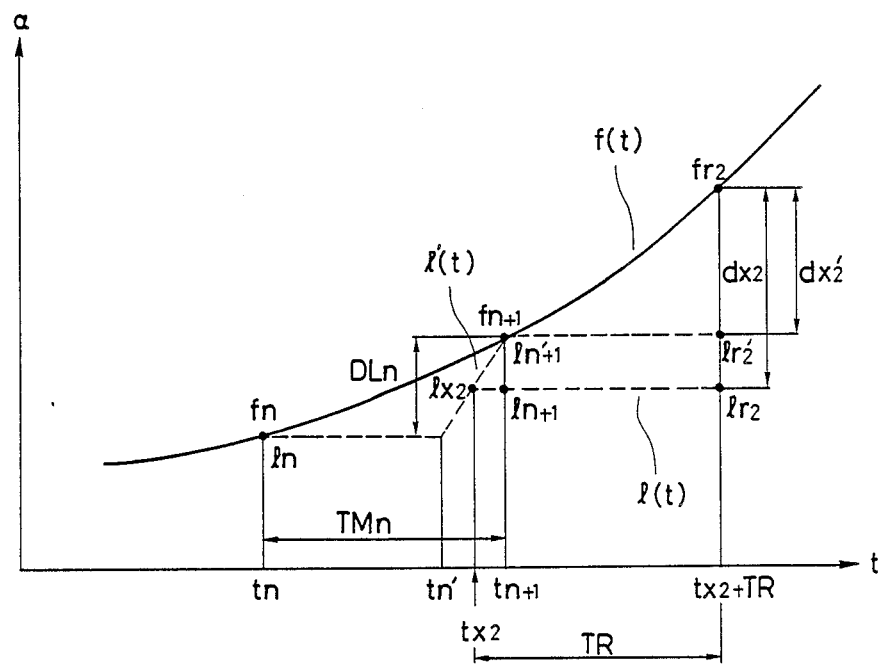
Figure 5:
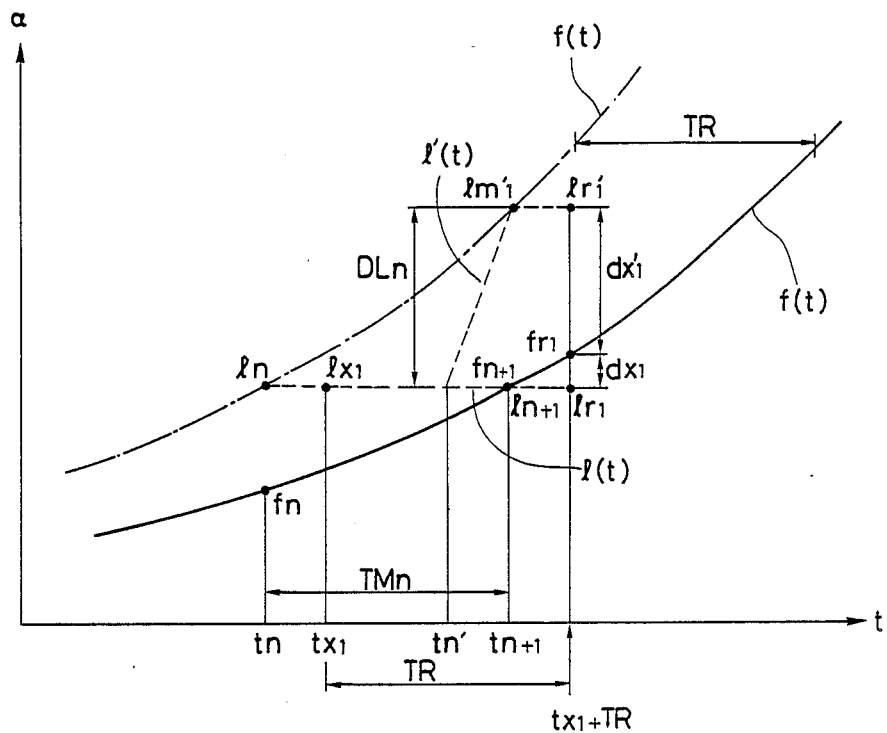
Figure 6:
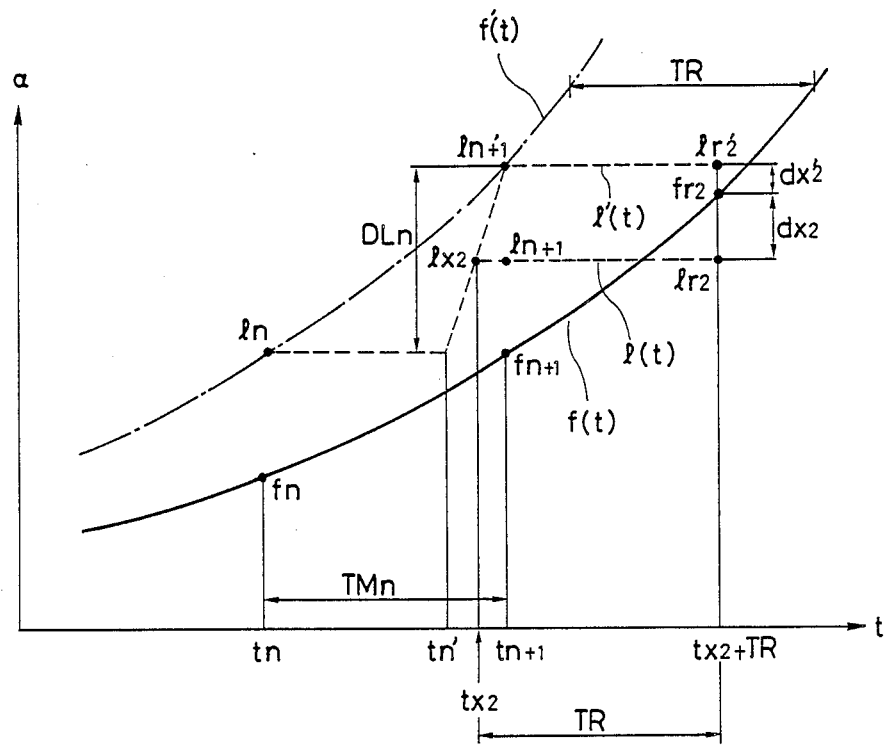
Figure 7:
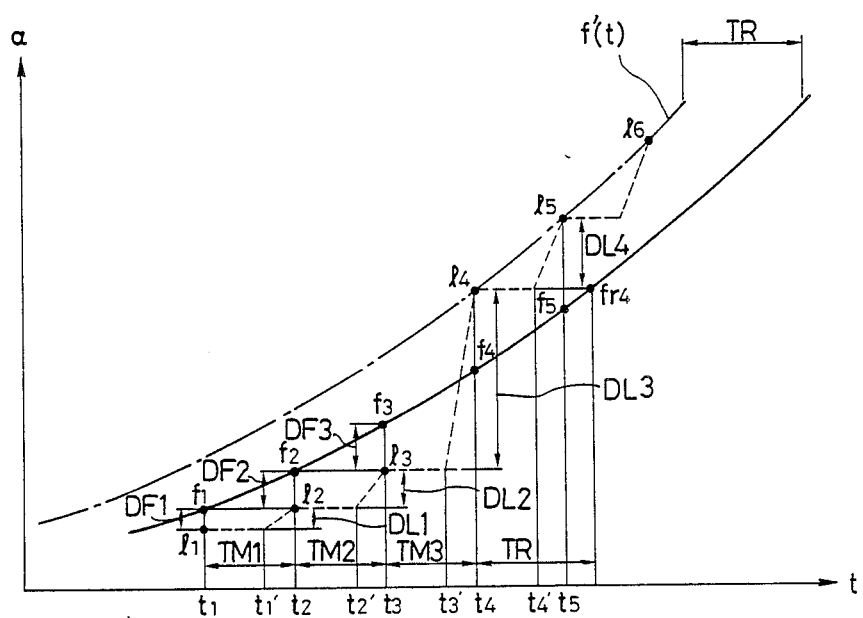

FIG. 1 is a flow chart showing the general flow of said program. When the execution of the program is started by said operation, the state of the switch SW1 adapted to be closed by the first-stage depression of the release button is detected at step (002) via step (001), and if the switch SW1 is OFF, a shift is made to step (003), where all flags for control and variables set in the RAM in the computer PRS are cleared and initialized, and at step (004), a counter AFCNT for counting the number of times of the focus detecting operation cycle is cleared. The steps (002)-(004) are repetitively executed until the switch SW1 becomes ON or the power source switch becomes OFF.

By the switch SW1 becoming ON, a shift is made from step (002) to step (005).

At step (005), a new focus detecting operation cycle is started and therefore, the value of the counter AFCNT is increased by one and the number of times of the cycle is counted.

At step (006), the "photometry" sub-routine for exposure control is executed. The computer PRS inputs the output SSPC of the photometric sensor SPC shown in FIG. 18 to the analog input terminal thereof, A/D-converts it, calculates an optimum shutter control value and an optimum aperture control value from the digital photometry value, and stores them at the predetermined addresses of the RAM. During the release operation, the computer PRS effects the control of the shutter and the aperture on the basis of these values.

Subsequently, at step (007), the "image signal input" sub-routine is executed. The flow of this sub-routine is shown in FIG. 19, and the computer PRS effects the inputting of an image signal from the sensor device SNS for focus detection. The details of it will be described later.

At the next step (008), the defocus amount DEF of the photo-taking lens is calculated on the basis of the input image signal. The specific calculation method is disclosed in Japanese Patent Application No. 61-160824, etc. by the assignee and therefore need not be described in detail.

At step (009), the content of the counter AFCNT is detected and, if AFCNT=1 and 2, foreseeing calculation cannot be done and therefore, the defocus amount DEF found at step (007) is used as the amount of lens driving DL and at the same time, this DEF is stored as data for foreseeing calculation. That is, when AFCNT=1, at step (010), the defocus amount DEF is stored in memories DL, DF1 and DL1, and when AFCNT=2, at step (012), the defocus amount DEF is stored in memories DL, DF2 and DL2. Thereafter, at step (011) or (013), the two flows execute lens driving in accordance with the content of the memory DL and a return is made to step (002).

When at step (009), AFCNT≧3, foreseeing calculation is possible and therefore, foreseeing calculation is effected in the "foreseeing calculation" sub-routine of step (014), and then step (015) is executed. At the next step (016), the state of the release switch SW2 is detected, and this will be described in connection with the interruption of the switch SW2. Here, with the switch SW2 being OFF, a return is made to step (002).

A description will now be given of a case where the release interruption by the switch SW2 is applied when the steps (005)-(015) encircled by a broken line are being executed. The switch SW2, as previously described, is connected to the interrupted input terminal of the computer PRS, and when the switch SW2 is closed, a shift may immediately be made to step (021) by the interruption function even when any step is being executed.

When the switch SW2 interruption of step (021) is applied when the steps encircled by a broken line are being executed, the state of the counter AFCNT is detected at step (022). When AFCNT≦2, the lens correction by foreseeing calculation is not yet completed and therefore, at step (023), an interruption return is made to the original step.

That is, when AFCNT=1, it means the first focus detecting operation cycle, that is, an interruption has been applied in the flow of steps (005)-(011), and when AFCNT=2, it means the second focus detecting operation cycle, that is, an interruption has been applied in the flow of steps (005)-(013) and therefore, in both of these cases, an interruption return is made and the original flow is executed, and a return is made to step (002).

When at step (022), AFCNT=3, it means the third focus detecting operation cycle, that is, an interruption has been applied into the flow of steps (005)-(015), and again at this time, at step (023), an interruption return is made to the original step, but thereafter at step (016), the state of the switch SW2 is detected and, if the switch SW2 is ON, at step (025), a shift is made to the release operation. Then, at step (026), the winding-up of the film is effected and a return is made to step (002).

When at step (022), AFCNT≧4, the corrected driving after foreseeing calculation has already been effected once at highest and therefore, at the step (024), the lens is forcedly stopped, and a shift is immediately made to the release of step (025).

The release sub-routine of step (025) will be described later. Subsequently, at step (026), the winding-up of the film is effected, and the film is wound up by one frame by properly controlling the motor controlling signals M1F and M1R shown in FIG. 18, but a detailed description of this operation is omitted.

Summing up the above-described operation, where the release interruption is applied when the focus detecting operation cycle is less than three times, an interruption return is made and the focus detecting operation cycle is effected three times, that is, the lens driving based on foreseeing calculation is effected once, whereafter release is permitted, and in and after the fourth focus detecting operation cycle, a release interruption is always permitted.

The image signal input sub-routine shown in FIG. 19 will now be described.

The "image signal input" sub-routine is an operation which is executed at the beginning of a new focus detecting operation, and when this sub-routine is called, at step (102) via step (101), the timer value TIMER of the self-running timer of the microcomputer PRS itself is stored in a memory TN in the RAM, whereby the starting time of the focus detecting operation is memorized.

At the next step (103), the state of the counter AFCNT is detected, and if AFCNT=1, it means the first focus detecting operation cycle and therefore, there is no focus detecting operation cycle time interval and accordingly, the data of the area TN is only stored in a memory TN1 and an advance is made to step (107).

If AFCNT=2, the timer interval TM1 between the last and the current focus detecting operation cycle is defined by TM1←TN−TN1 (the data of TN is the starting time of the current focus detection, and the data of TN1 is the starting time of the last focus detecting operation defined at step (104) and consequently, TN−TN1 is the last focus detecting operation cycle time interval and this is stored in the memory TM1). Also, the content of the memory TM1 is input to a memory TM2, the data of the area TN is input to the memory TN1, and the data of the memory TN1 is renewed from the starting time of the last focus detecting operation to the starting time of the current focus detecting operation.

When AFCNT≧3, there are two focus detecting operation cycle time interval data TM1 and TM2 to be renewed and therefore, renewal of these data is effected by the equation of step (106), and renewal of TN1 is also effected in the same manner as at step (105). The data of the memory TM1 defined at step (105) is used as the data of the memory TM1 when AFCNT=3, but renewal of the data between the memories is effected such as TM1←TM2 and therefore, for that purpose, it is necessary that the data of the memory TM2 be also defined. This is the reason why at step (105), TM2 has been defined. That is, when AFCNT=3, TM1 defined when AFCNT=2 remains as TM1, and when AFCNT≧4, renewal of TM1←TM2 is effected.

That is, whenever AFCNT≧3 at these steps (104)-(106), the before-last focus detecting operation cycle time interval data is renewed and input to the memory TM1 and the last focus detecting operation cycle time interval data is renewed and input to the memory TM2 each time the focus detecting operation cycle is repetitively effected.

Now, at the next step (107), the sensor device SNS is caused to start the accumulation of an optical image. Specifically, the microcomputer PRS delivers an "accumulation starting command" to the sensor driving circuit SDR by communication, and in response thereto, the driving circuit SDR renders the clear signal CLR of the photoelectric conversion element portion of the sensor device SNS into 'L' and causes the sensor device to start the accumulation of charges.

At step (108), the timer value of the self-running timer is stored in a variable TI and the current time is memorized.

At the next step (109), the state of the input INTEND terminal of the computer PRS is detected and whether the accumulation has been completed is examined. The sensor driving circuit SDR renders the signal INTEND into 'L' simultaneously with the start of the accumulation, and monitors the AGC signal SAGC from the sensor device SNS, and when the signal SAGC reaches a predetermined level, the sensor driving circuit SDR renders the signal INTEND into 'H' and at the same time, renders a charge transfer signal SH into 'H' for a predetermined time and causes the charges of the photoelectric conversion element portion to be transferred to the CCD portion.

If at step (109), the INTEND terminal is at 'H', it means that the accumulation has been completed, and a shift is made to step (113), and if the INTEND terminal is at 'L', it means that the accumulation is not yet completed, and a shift is made to step (110).

At step (110), the time TI memorized at step (108) is subtracted from the timer value TIMER of the self-running timer and the result is stored in a variable TE. Thus, the time from after the accumulation has been started until now, i.e., the so-called accumulation time, is stored in the variable TE.

At step (111), TE is compared with a constant MAXINT, and if TE is less than MAXINT, a return is made to step (109), where the completion of the accumulation is again waited for. When TE becomes equal to or greater than MAXINT, a shift is made to step (112), where the accumulation is forcedly completed.

The forced completion of the accumulation is executed by an "accumulation completion command" being delivered from the computer PRS to the driving circuit SDR. When the "accumulation completion command" is sent from the computer PRS to the driving circuit SDR, the driving circuit SDR renders the charge transfer signal SH into 'H' for a predetermined time and causes the charges of the photoelectric converting portion to be transferred to the CCD portion. The accumulation by the sensor is completed by the flow up to step (112).

At step (113), the A/D conversion of a signal AOS obtained by amplifying the image signal OS of the sensor device SNS by the sensor driving circuit SDR and the storage of the resultant digital signal into the RAM are effected. More particularly, the driving circuit SDR produces CCD driving clocks $\phi 1$ and $\phi 2$ in synchronism with the clock CK from the computer PRS and provides them to the sensor device SNS, and the sensor device SNS has its CCD portion driven by the CCD driving clocks $\phi 1$ and $\phi 2$, whereby the charges in the CCD are time-serially output as image signals from the output OS. These signals are amplified by an amplifier in the driving circuit SDR, whereafter they are input as AOS to the analog input terminal of the computer PRS. The computer PRS effects A/D conversion in synchronism with the clock CK the computer itself outputs, and the digital image signals after the A/D conversion are successively stored at the predetermined addresses of the RAM.

When the image signal input is completed in this manner, at step (114), the "image signal input" sub-routine is returned to the main program.

Figure 20:
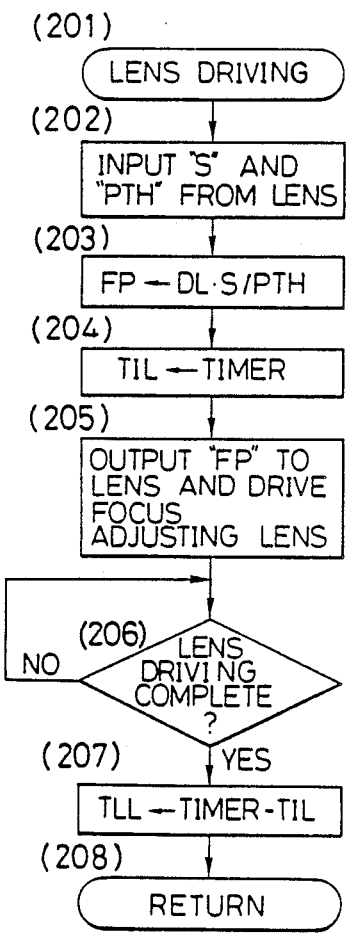

FIG. 20 shows the flow chart of the "lens driving" sub-routine.

When this sub-routine is executed, at step (202), communication is effected with the lens and two data "S" and "PTH" are input. "S" is the "coefficient of the defocus amount vs. the amount of axial movement of the focus adjusting lens" inherent to the photo-taking lens, and for example, in the case of a totally moved type single lens, the entire photo-taking lens is the focus adjusting lens and therefore, S=1, and in the case of a zoom lens, S is varied by each zoom position. "PTH" is the amount of axial movement of the focus adjusting lens LNS per output pulse of the encoder ENCF operatively associated with the movement of the focus adjusting lens LNS in the direction of the optic axis.

Thus, the value of the amount of axial movement of the focus adjusting lens converted into the output pulse number of the encoder by the defocus amount DL to be focus-adjusted and said S and PTH, i.e., the so-called amount of lens driving FP, is given by the following equation:

$$FP = DL \times S/PTH$$

Step (203) executes the above equation as it is.

At step (204), the current time data is stored from the aforementioned self-running timer TIMER in a memory TIL.

At step (205), FP found at step (203) is delivered to the lens and the driving of the focus adjusting lens (in the case of a totally moved type single lens, the entire photo-taking lens) is commanded.

At the next step (206), communication is effected with the lens and whether the driving by the amount of lens driving FP commanded at step (204) has been completed is detected, and when the driving is completed, a shift is made to step (207).

The detection of the completion of the driving by said amount of lens driving FP is executed by the amount of lens driving FP being input to the counter in the control circuit LPRS by said communication and the coincidence between this counter value and the count value of the pulse SENCF output from the encoder ENCF with the lens driving being detected by the control circuit LPRS.

At step (207), the lens driving starting time data stored in the memory TIL is subtracted from the current time of the current self-running timer TIMER, whereby the lens driving time is calculated and this is stored in a memory TLL, and at step (208), a return is made to the main program.

Figure 21:
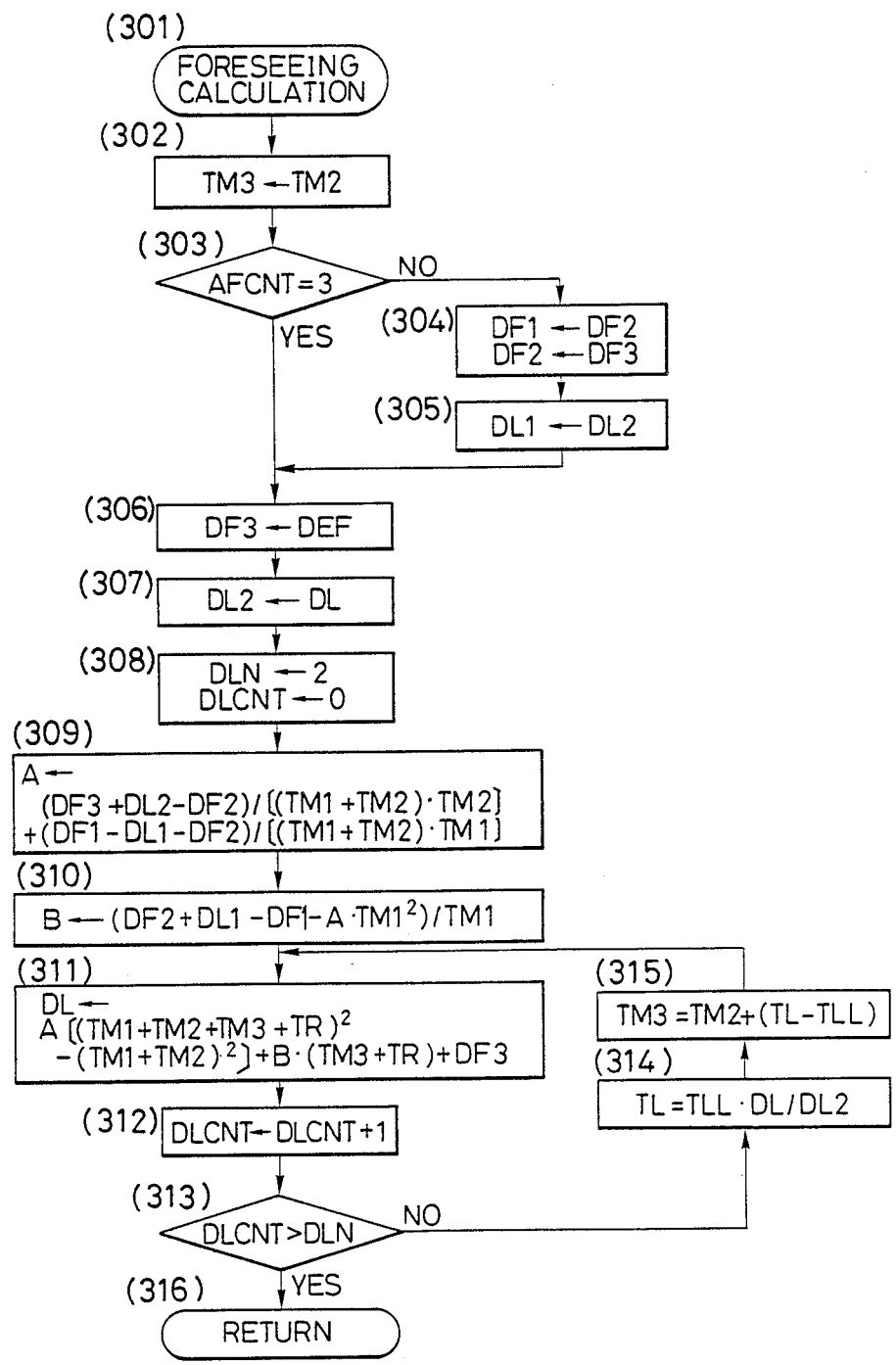

FIG. 21 shows the flow chart of foreseeing calculation. This is a flow in which when there are three or more focus detecting operation cycle data, the position of the image plane of the object is approximated by a quadratic function on the basis of the latest three data of the focus detecting operation cycle repetitively effected and the position of the image plane in the future is foreseen.

First, at step (302), the data in the memory TM2 is input to the memory TM3. As previously described, the last focus detecting operation cycle time interval data is input in the memory TM2, and at step (302), data equal to the interval from the last to the current focus detecting operation is input to the memory TM3 for memorizing the time interval from the current to the next focus detecting operation.

At step (303), the state of the counter AFCNT is detected, and when AFCNT=3, that is, when this foreseeing calculation sub-routine is called for the first time, at step (306), the current defocus amount DEF is stored in the memory DF3, and at step (307), the last amount of lens driving DL is stored in the memory DL2.

At step (308), 2 is set in a variable DLN. This DLN is a step for prescribing the number of the repeated calculations of step (311) to be described, and in the present embodiment, it is set to two times. Also, 0 is set in a counter DLCNT. Step (309) is a step for finding the coefficient $a_n$ of the equation (11) in accordance with the aforementioned equation (5) or (8) and placing it as A, and at this step (309), $a_n = A$ is found in accordance with the equation (8). It is now the first foreseeing calculation sub-routine, that is, AFCNT =3, and therefore, the data in the memories DF2, DL1 and DF1 used for the calculation of step (309) are the before-last and last defocus amounts in the first and second focus detecting operation cycles stored in the memories DF1, DF2 and DL1 at step (012) and (010) and the first amount of lens driving. Also, the data in the memories TM1 and TM2 are the before-last and last time intervals prescribed at step (106) and the data in the memories DF3 and DL2 are the data of steps (306) and (307).

At step (310), the coefficient $b_n$ of the equation (11) is found in accordance with the equation (6) or (9), and this is placed as B. The data used at step (309) is used as the data in the memories DF2, DL1, DF1 and TM1 used at step (310).

At step (311), the current amount of lens driving is found in accordance with the equation (11) and is input to the memory DL. What has been assumed as a value equal to the last time interval at step (302) is used as the data in the memory TM3 used in the first calculation of step (311).

At step (312), the counter DLCNT is advanced by one, and at step (313), the counter DLCNT is compared with a variable DLN. Since now DLCNT=1 and DLN=2, an advance is made to step (314). At step (314), the calculation shown in the equation (16) is effected, and the driving time corresponding to the foreseen amount of lens driving found at step (311) is found. The data used at the step (314) are the last lens driving time, the foreseen amount of lens driving found at step (311) and the last amount of lens driving which are stored in the memories TLL, DL and DL2, respectively, and the foreseen driving time found on the basis of these data is input to a memory TL.

At step (315), the new current focus detecting operation cycle time corrected by the equation (21) on the basis of said foreseen driving time is found and it is input to the memory TM3, and at step (311), the current amount of lens driving is again calculated on the basis of the corrected current cycle time interval, whereafter at step (313), the steps (311)–(315) are repetitively executed until the counter DLCNT=3, and the current amount of lens driving which takes into account the foreseen lens driving time found by the use of the equation (21) is calculated, and when DLCNT=3, a return is made at step (316).

If at step (303), the counter AFCNT≠3, that is, AFCNT≧4, steps (304) and (305) are executed. At step (304), the content of the memory DF2 is input to the memory DF1 and the content of the memory DF3 is input to the memory DF2, and the data are renewed each time the focus detecting operation cycle is effected so that the before-last and last detected defocus amounts are always input to the memories DF1 and DF2. At step (305), the content of the memory DL2 is input to the memory DL1, and the before-last data is always input to the memory DL1.

Thereafter, step (306) and subsequent steps are executed, and like AFCNT=3, the current amount of lens driving which takes the foreseen lens driving time into account is calculated.

Figure 22:
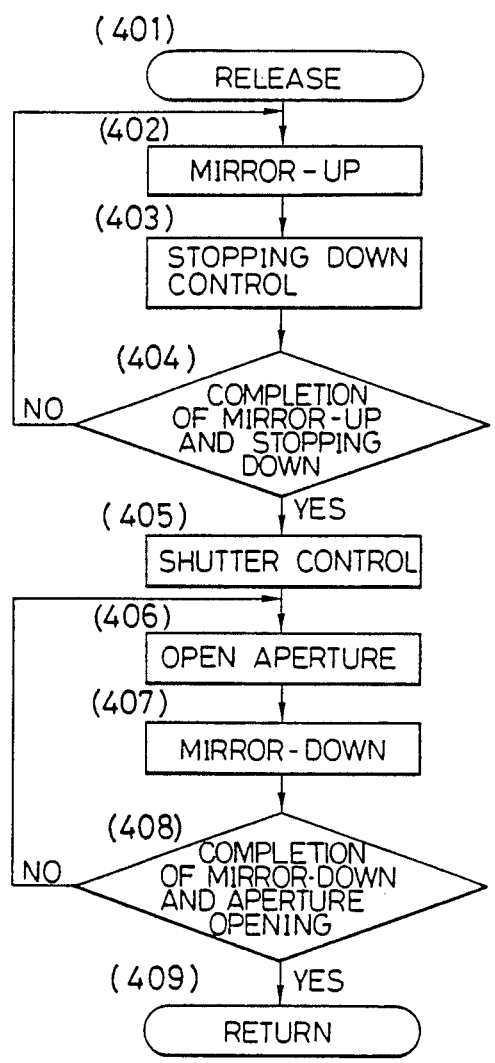

FIG. 22 shows the release sub-routine.

At step (402), the mirror-up movement of the quick return mirror of the camera is effected. This is executed by controlling the motor MTR2 by the use of the motor driving signals M2F and M2R shown in FIG. 18 through the driving circuit MDR2.

At the next step (403), the aperture control value already stored in the photometry sub-routine of the previous step (006) is delivered to the lens to thereby cause the lens to effect aperture control.

Whether the mirror-up movement and the aperture control of steps (402) and (403) have been completed is detected at step (404), and usually several tens of milliseconds are required for these two controls and this is the main factor of what is called the release time lag.

At step (404), whether the mirror-up movement and the aperture control of the previous steps (402) and (403) have already been completed is detected. The mirror-up movement be confirmed by means of a detection switch, not shown, which is attendant on the mirror, and the aperture control is confirmed by communication as to whether the stop has been driven to a predetermined aperture value relative to the lens. When one of them is not yet completed, waiting is done at this step and the detection of the state is continuedly effected. When the two controls are confirmed, a shift is made to step (405). At this point of time, the preparation for exposure has been made.

At step (405), shutter control is effected at the shutter control value already stored by the photometry sub-routine of the previous step (006) and the film is exposed.

When shutter control is completed, at the next step (406), a command is sent to the lens so as to make the aperture open, and subsequently at step (407), mirror-down movement is effected. Mirror-down movement, like mirror-up movement, is executed by controlling the motor MTR2 by the use of the motor controlling signals M2F and M2R.

At the next step (408), as at step (404), the completion of mirror-down movement and aperture opening control is waited for. When both of mirror-down movement and aperture opening control are completed, a shift is made to step (409), where a return is made to the main program.

Newly outlining the above-described flow, in FIG. 1, in the first and second focus detecting operation cycles after the closing of the switch SW1, lens driving is effected in accordance with the defocus amount DEF detected by the flow of steps (005)–(011) or (005)–(013), and in the third and subsequent focus detecting operation cycles, the above-described foreseen driving according to the quadratic functional equation is effected the flow of steps (005)–(009), (014)–(015) in accordance with the result of the past two focus adjustments and the result of the current focus detection.

When during said focus detecting operation cycles, a release interruption is made by the closing of the switch SW2, if the number of the focus detecting operation cycles is less than three, an intermediate return is immediately made and release is permitted upon completion of the third focus detecting operation cycle, and the release interruption in and after the fourth focus detecting operation cycle is immediately permitted.

On the other hand, when during the foreseen driving according to the quadratic functional equation, the current amount of lens driving DL is to be found in FIG. 21, the amount of lens driving DL is first found by the use of the equation (11) on the assumption that the next focus detection time interval (TM3) = the last focus detection time interval (TM2), and correction of the next focus detection time interval (TM3) is effected by the foreseen amount of driving DL and the result of the past lens driving, and the foreseen amount of lens driving DL is newly recalculated by the use of the equation (11). Thus, highly accurate foreseeing of the amount of lens driving becomes possible.

In the above-described embodiment, correction of the lens driving time has been uniformly effected under the premise of the lens driving system of FIGS. 9–11 that "the amount of driving and the driving time are proportional to each other" (the equation (16)), but where the lens sends the information regarding its own control system, more delicate correction will become possible if the correction system is changed in accordance with that information. An embodiment therefor will hereinafter be described.

In the aforedescribed embodiment, only the equation (16) has been used as the relation between the amount of lens driving and the lens driving time, but the equations (19) and (16) can be generalized as $$TL = TLL \cdot \left(\frac{DL}{DLL}\right)^{DN} . \tag{22}$$

Assuming that DN = 1, the equation (16) becomes effective, and assuming that DN = 0.5, the equation (19) becomes effective. With respect also to a lens in which other complicated control than this is effected, approximation is possible with DN placed as a suitable number.

Accordingly, the lens sends the camera a constant regarding its own control system, for example, DN, and the camera changes over the correction system on the basis thereof, whereby highly accurate correction becomes possible. According to this system, various driving characteristics differ from lens to lens, and in a zoom lens, even if the characteristics are changed by zooming, the characteristics can be expressed by the only one numerical value DN inherent to that lens, and this forms no great hindrance even to the capacity of the memory area in the lens.

Figure 23:
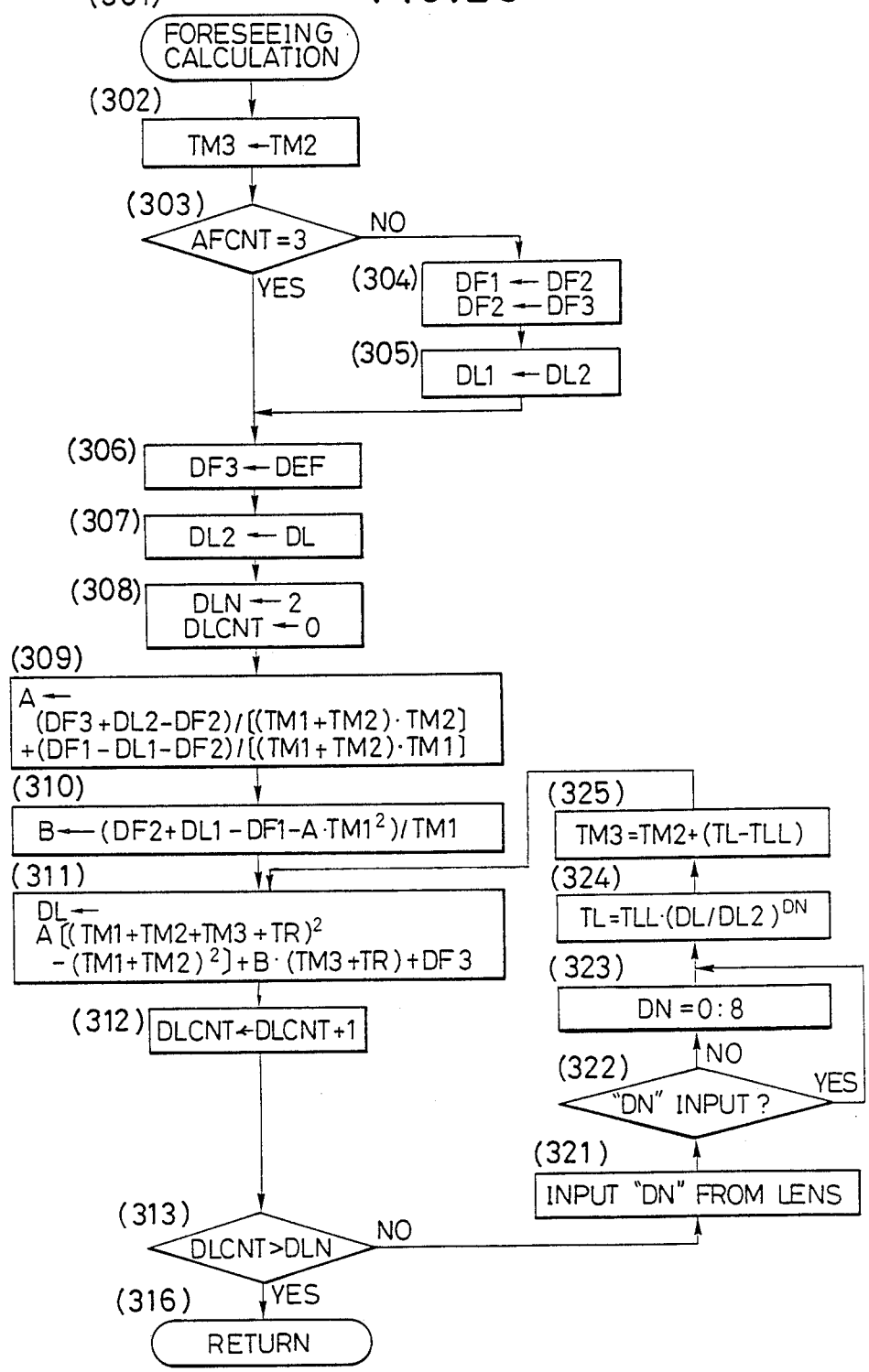
FIG. 23 shows another example of the control flow of the present invention.

The flow chart of the embodiment according to the system described just above is shown in FIG. 23, wherein steps similar to those of FIG. 21 are indicated by similar numerals.

In the present embodiment, the steps differing from those of the embodiment up to FIG. 21 are only steps (321)–(325) and therefore, the other steps need not be described. First, at step (321), communication is effected with the lens and the value of an inherent numerical value DN is read out from the lens. Then, at step (322), the presence or absence of the input of DN is judged, and if the lens is a lens which does not have the information about DN, at step (323), a safe value, e.g. 0.8, is substituted into the lens, and an advance is made to step (324). If there is the input of DN, the input value is used and at step (324), the correction of the equation (22) is effected. At step (325), the correction of TM3 by the equation (21) similar to step (315) is effected and a shift is made to step (311), where the amount of lens driving DL based on the equation (11) is again calculated.

In the flow of FIG. 23, only the above-described steps differ from the flow of FIG. 21, and the subsequent operations are the same as FIG. 21, so that accurate calculation of the foreseen amount of lens driving and accurate lens driving are carried out.

As described above, in the present invention, the lens driving time is accurately foreseen and the current amount of lens driving is foreseen by the use of this foreseen lens driving time and therefore, the correction of the focus by the delay in the pursuit of a moving object can be accomplished more accurately.

What is claimed is:

1. An automatic focus adjusting device, comprising:
   a control amount calculating circuit for calculating a control amount regarding lens driving for making a lens in focus to an object after a predetermined time on the basis of past focus adjusting operation data and predetermined time data;
   a time calculating circuit for calculating a lens driving time corresponding to said calculated control amount on the basis of said calculated control amount;
   determining means for determining said predetermined time data in conformity with the lens driving time calculated by said time calculating circuit; and
   a control circuit for causing said control amount calculating circuit to again calculate the control amount with said predetermined time data determined by said determining means as a factor.

2. An automatic focus adjusting device according to claim 1, wherein said control amount calculating circuit calculates the control amount using a predetermined functional equation with the past focus adjusting operation data and the predetermined time data as factors, and substitutes the predetermined time data determined by said determining means for said predetermined time data and effects said calculation during the second calculation effected by said control circuit.

3. An automatic focus adjusting device according to claim 2, wherein said past focus adjusting operation data are a defocus amount detected in the past and a past amount of lens driving.

4. An automatic focus adjusting device having a control amount calculating circuit for calculating a control amount regarding lens driving for making a lens in focus to an object after a predetermined time on the basis of past focus adjusting operation data and predetermined time data, comprising;
   (a) determining means for determining said predetermined time data on the basis of said calculated control amount; and
   (b) a control circuit for causing the control amount calculating circuit to again calculate the control amount with said predetermined time data determined by said determining means as a factor.

5. An automatic focus adjusting device according to claim 4, further comprising the control amount calculating circuit which calculates the control amount by a predetermined functional equation with the past focus adjusting operation data and the predetermined time data as factors, and substitutes the predetermined time data determined by said determining means for said predetermined time data, and effects said calculation during the second calculation effected by said control circuit.

6. An automatic focus adjusting device according to claim 4, wherein said past focus adjusting operation data are a defocus amount detected in the past and a past amount of lens driving.

7. An automatic focus adjusting device having a focus detecting circuit for detecting the focus state of an imaging optical system and outputting a focus signal, and a driving circuit for driving the imaging optical system on the basis of the focus signal detected by the focus detecting circuit, and which repetitively performs the focus adjusting operation including the focus detecting operation and the operation of driving the imaging optical system, comprising:
(a) a foreseeing calculation circuit for assuming a current focus adjusting operation time as a predetermined time, and for calculating a control value conforming to a position of an image plane of an object after said predetermined time on the basis of a result of past focus adjustment and the current focus signal;
(b) an adjusting circuit for adjusting said predetermined time in conformity with said calculated control value; and
(c) a correcting circuit for correcting said control value with a difference between the predetermined time adjusted by said adjusting circuit and said assumed predetermined time being taken into account.

8. An automatic focus adjusting device according to claim 7, wherein said correcting circuit causes said foreseeing calculation circuit, on the basis of the adjusted predetermined time, to re-calculate the control value conforming to the position of the image plane of the object after said adjusted predetermined time.

9. An automatic focus adjusting device which is provided with a focus detecting circuit for detecting the focus state of an imaging optical system and outputting a focus signal, and a driving circuit for driving the imaging optical system on the basis of the focus signal detected by the focus detecting circuit, and which repetitively performs the focus adjusting operation including the focus detecting operation and the operation of driving the imaging optical system, comprising:
(a) a foreseeing calculation circuit for calculating a control value conforming to a position of an image plane of an object after a predetermined time on the basis of a result of a past focus adjustment and the current focus signal;
(b) a determining circuit for determining said predetermined time on the basis of the control value calculated by said calculation circuit; and
(c) a control circuit for causing said calculation circuit for again calculate the control value with the predetermined time determined by said determining circuit as a factor.

10. An automatic focus adjusting device which is provided with a focus detecting circuit for detecting the focus state of an imaging optical system and outputting a focus signal, and a driving circuit for driving the imaging optical system on the basis of the focus signal detected by the focus detecting circuit, and which repetitively performs the focus adjusting operation including the focus detecting operation and the operation of driving the imaging optical system, comprising:
(a) a foreseeing calculating circuit for calculating a control value for making the imaging optical system in-focus to an object after a predetermined time on the basis of a result of a past focus adjustment and a set time data;
(b) a determining circuit for determining the set time data on the basis of the control value calculated by said calculation circuit; and
(c) a correcting circuit for correcting the control value according to a difference between the set time data determined by said determining circuit and a predetermined set time data.

* * * * *

UNITED STATES PATENT AND TRADEMARK OFFICE
CERTIFICATE OF CORRECTION

PATENT NO. : 4,974,002

DATED : November 27, 1990

INVENTOR(S) : Ichiro OHNUKI, ET AL

It is certified that error appears in the above-identified patent and that said Letters Patent is hereby corrected as shown below:

COLUMN 1:

Line 36, "Curve ((t)" should read -- Curve l(t)--;

Line 40, "$[ti_i', t_{i+1}]$" should read --$[t_i', t_{i+1}]$

Line 65, "a" should read --an--.

COLUMN 2:

Line 22, "and (2)'" should read --and (2)"--.

COLUMN 3:

Line 10, "$t_n'$" should read --$t_n,$--; and

Line 54, "$l_{rl}$ at the time $t_{xl}$ + TR" should read --$l_{rl}$ at the time $t_{xl}$ + TR--.

COLUMN 4:

Line 56, "$t_3'$." should read --$t_{3'}$.--; and

UNITED STATES PATENT AND TRADEMARK OFFICE
CERTIFICATE OF CORRECTION

PATENT NO. : 4,974,002

DATED : November 27, 1990

INVENTOR(S) : Ichiro OHNUKI, ET AL

It is certified that error appears in the above-identified patent and that said Letters Patent is hereby corrected as shown below:

<u>COLUMN 5</u>:

Line 16, "driving" should read --driving and--.

<u>COLUMN 8</u>:

Line 24, "multi-driving" should read --multi-dividing--.

<u>COLUMN 11</u>:

Line 30, "an" should read --an interruption--;

Line 34, "charging" should be deleted; and

Line 35, "the" should be deleted, and "and" (first occurrence) should read --and charging the--.

UNITED STATES PATENT AND TRADEMARK OFFICE
CERTIFICATE OF CORRECTION

PATENT NO. : 4,974,002

DATED : November 27, 1990

INVENTOR(S) : Ichiro OHNUKI, ET AL

It is certified that error appears in the above-identified patent and that said Letters Patent is hereby corrected as shown below:

COLUMN 13:

Line 35, "interrupted" should read --interruption--; and

Line 66, "at" (first occurrence) should read --at the--.

COLUMN 19:

Line 4, "intermediate" should read --interruption--.

COLUMN 20:

Line 58, "comprising;" should read --comprising:--.

COLUMN 22:

Line 19, "for" should read --to--; and

Line 31, "calculating" (1st. occ.) should read --calculation--.

Signed and Sealed this

Twelfth Day of January, 1993

*Attest:*

DOUGLAS B. COMER

*Attesting Officer*　　*Acting Commissioner of Patents and Trademarks*